United States Patent
Cunningham, II et al.

(10) Patent No.: US 11,393,283 B2
(45) Date of Patent: *Jul. 19, 2022

(54) METHODS AND ARCHITECTURE FOR CASHLESS SYSTEM SECURITY

(71) Applicant: IGT, Las Vegas, NV (US)

(72) Inventors: William R. Cunningham, II, Reno, NV (US); Scott J. MacMillan, Reno, NV (US)

(73) Assignee: IGT, Las Vegas, NV (US)

( * ) Notice: Subject to any disclaimer, the term of this patent is extended or adjusted under 35 U.S.C. 154(b) by 267 days.

This patent is subject to a terminal disclaimer.

(21) Appl. No.: 16/663,007

(22) Filed: Oct. 24, 2019

(65) Prior Publication Data
US 2020/0058190 A1    Feb. 20, 2020

Related U.S. Application Data

(63) Continuation of application No. 15/090,227, filed on Apr. 4, 2016, now Pat. No. 10,460,560, which is a
(Continued)

(51) Int. Cl.
*G07F 17/32*    (2006.01)
*G06F 21/10*    (2013.01)
(Continued)

(52) U.S. Cl.
CPC ........ *G07F 17/3241* (2013.01); *G06F 21/105* (2013.01); *G06F 21/34* (2013.01);
(Continued)

(58) Field of Classification Search
CPC .. G06F 17/3241; G06F 17/32; G06F 17/3244; G06F 17/3251; G06F 17/3281;
(Continued)

(56) References Cited

U.S. PATENT DOCUMENTS

| 5,811,772 A | 9/1998 | Lucero |
| 5,902,983 A | 5/1999 | Crevelt et al. |

(Continued)

FOREIGN PATENT DOCUMENTS

| CN | 101198993 A | 6/2008 |
| WO | 0062214 A1 | 10/2000 |

(Continued)

OTHER PUBLICATIONS

"Examiner's First Report", AU2008219557 (2 pages), dated Feb. 7, 2012.

(Continued)

*Primary Examiner* — James D Nigh
(74) *Attorney, Agent, or Firm* — Neal, Gerber & Eisenberg LLP

(57) ABSTRACT

Methods for secure transactions between gaming machines and portable devices are described. A logic device, separate from a master gaming controller on the gaming machine and placed in the gaming machine, may be operable to authenticate a portable device, such as a smart card, and authorize transactions involving transfers of indicia of credit between the portable device and the gaming machine. The logic device may be operable to send authentication information relating to the portable device to a remote host where a value amount of transactions involving the portable device authorized by the logic device may be higher when the logic device and the remote host authenticate the portable device as opposed to when the portable device is only authenticated by the logic device.

20 Claims, 13 Drawing Sheets

Related U.S. Application Data continuation of application No. 13/765,327, filed on Feb. 12, 2013, now Pat. No. 9,324,209, which is a continuation of application No. 11/967,916, filed on Dec. 31, 2007, now Pat. No. 8,463,711.

(60) Provisional application No. 60/904,017, filed on Feb. 27, 2007.

(51) Int. Cl.
*G06F 21/34* (2013.01)
*G06Q 20/10* (2012.01)
*G06Q 20/36* (2012.01)

(52) U.S. Cl.
CPC ......... *G06Q 20/105* (2013.01); *G06Q 20/367* (2013.01); *G07F 17/32* (2013.01); *G07F 17/3244* (2013.01); *G07F 17/3251* (2013.01); *G07F 17/3281* (2013.01); *G06F 2221/2109* (2013.01); *G06Q 20/36* (2013.01); *G06Q 20/3676* (2013.01)

(58) Field of Classification Search
CPC .............. G06F 21/105; G06F 21/34; G06F 2221/2109; G06Q 20/105; G06Q 20/367; G06Q 20/36; G06Q 20/3676
USPC ......................................................... 463/25
See application file for complete search history.

(56) References Cited

U.S. PATENT DOCUMENTS

| | | | |
|---|---|---|---|
| 6,149,522 A | 11/2000 | Alcorn et al. | |
| 6,264,561 B1 | 7/2001 | Saffari et al. | |
| 6,402,026 B1 | 6/2002 | Schwier | |
| 6,527,638 B1 | 3/2003 | Walker et al. | |
| 6,577,733 B1 | 6/2003 | Charrin | |
| 6,645,077 B2 | 11/2003 | Rowe | |
| 6,682,421 B1 | 1/2004 | Rowe et al. | |
| 6,685,567 B2 | 2/2004 | Cockerille et al. | |
| 6,804,763 B1 | 10/2004 | Stockdale et al. | |
| 6,852,031 B1 | 2/2005 | Rowe | |
| 7,024,390 B1 | 4/2006 | Mori et al. | |
| 7,111,141 B2 | 9/2006 | Nelson | |
| 7,152,783 B2 * | 12/2006 | Charrin ................ G06Q 20/367 235/440 | |
| 7,384,339 B2 | 6/2008 | Lemay et al. | |
| 7,419,428 B2 | 9/2008 | Rowe | |
| 7,515,718 B2 | 4/2009 | Nguyen et al. | |
| 7,650,389 B2 | 1/2010 | Mohanty | |
| 7,690,043 B2 * | 3/2010 | Saunders ............ G07F 17/3237 463/42 | |
| 7,765,162 B2 | 7/2010 | Binder et al. | |
| 7,780,526 B2 | 8/2010 | Nguyen et al. | |
| 7,819,742 B2 | 10/2010 | Chamberlain et al. | |
| 7,997,981 B2 | 8/2011 | Rowe et al. | |
| 8,055,910 B2 | 11/2011 | Kocher et al. | |
| 8,123,616 B2 * | 2/2012 | Wells .................. G07F 17/3206 463/36 | |
| 8,172,671 B2 | 5/2012 | Walker et al. | |
| 8,243,929 B2 * | 8/2012 | Wells .................. G07F 17/3206 713/186 | |
| 8,463,711 B2 | 6/2013 | Cunningham et al. | |
| 2002/0077178 A1 | 6/2002 | Oberberger et al. | |
| 2002/0145051 A1 | 10/2002 | Charrin | |
| 2003/0014370 A1* | 1/2003 | Charrin ................ G07F 7/0873 705/65 | |
| 2003/0145086 A1 | 7/2003 | Oreilly | |
| 2003/0171145 A1 | 9/2003 | Rowe | |
| 2003/0200184 A1 | 10/2003 | Dominguez et al. | |
| 2004/0087360 A1 | 5/2004 | Chamberlain et al. | |
| 2004/0127277 A1 | 7/2004 | Walker et al. | |
| 2004/0192442 A1* | 9/2004 | Wells .................. G07F 17/3232 463/36 |
| 2004/0199769 A1 | 10/2004 | Proudler | |
| 2004/0230535 A1 | 11/2004 | Binder et al. | |
| 2005/0097320 A1* | 5/2005 | Golan ................ G06Q 20/4014 713/166 |
| 2005/0156026 A1 | 7/2005 | Ghosh et al. | |
| 2005/0192099 A1 | 9/2005 | Nguyen et al. | |
| 2005/0193209 A1* | 9/2005 | Saunders ............ G07F 17/3225 713/182 |
| 2005/0261058 A1 | 11/2005 | Nguyen et al. | |
| 2005/0266919 A1 | 12/2005 | Rowe et al. | |
| 2006/0025207 A1 | 2/2006 | Walker et al. | |
| 2006/0035707 A1 | 2/2006 | Nguyen et al. | |
| 2006/0160614 A1 | 7/2006 | Walker et al. | |
| 2006/0205497 A1* | 9/2006 | Wells ...................... G07F 17/32 463/29 |
| 2006/0258427 A1 | 11/2006 | Rowe et al. | |
| 2007/0004510 A1 | 1/2007 | Underdahl et al. | |
| 2007/0016795 A1* | 1/2007 | Asano ...................... G07F 19/20 713/168 |
| 2007/0033419 A1 | 2/2007 | Kocher et al. | |
| 2007/0060394 A1 | 3/2007 | Gowin et al. | |
| 2007/0117623 A1 | 5/2007 | Nelson et al. | |
| 2007/0243925 A1 | 10/2007 | Lemay et al. | |
| 2007/0278294 A1* | 12/2007 | Page ...................... G06Q 20/363 235/382 |
| 2007/0298873 A1 | 12/2007 | Nguyen et al. | |
| 2008/0045330 A1 | 2/2008 | Chim | |
| 2008/0113772 A1 | 5/2008 | Burrill et al. | |
| 2008/0140568 A1* | 6/2008 | Henry ................. G06Q 20/3674 705/40 |
| 2008/0188308 A1 | 8/2008 | Shepherd et al. | |
| 2008/0203152 A1 | 8/2008 | Hammad et al. | |
| 2008/0207307 A1 | 8/2008 | Cunningham et al. | |
| 2009/0069090 A1 | 3/2009 | Moser et al. | |
| 2009/0265105 A1 | 10/2009 | Davis et al. | |
| 2010/0197383 A1 | 8/2010 | Rader et al. | |
| 2011/0022838 A1 | 1/2011 | Shaikh | |
| 2012/0214577 A1 | 8/2012 | Petersen et al. | |

FOREIGN PATENT DOCUMENTS

| | | |
|---|---|---|
| WO | 0067177 A2 | 11/2000 |
| WO | 0148580 A2 | 7/2001 |
| WO | 0184516 A2 | 11/2001 |
| WO | 2005028046 A2 | 3/2005 |
| WO | 2007143537 A2 | 12/2007 |
| WO | 2008016952 A2 | 2/2008 |
| WO | 2008106270 A2 | 9/2008 |
| WO | 2011126935 A1 | 10/2011 |

OTHER PUBLICATIONS

"International Preliminary Report on Patentability", PCT/US2011/030894 (8 pages), dated Oct. 18, 2012.
"International Preliminary Report on Patentability", PCT/US2008/052939 (6 pages), dated Sep. 1, 2009.
"International Search Report and Written Opinion", PCT/US2008/052939 (10 pages), dated Jan. 21, 2009.
"International Search Report and Written Opinion", PCT/US2011/030894 (8 pages), dated Jun. 10, 2011.
"Patent Examination Report No. 1", AU2013205377 (5 pages), dated Jul. 6, 2015.
"Written Opinion", SG201106938-2 (7 pages), dated May 4, 2012.
Dai, Xiaoling , et al., "Off-Line Micro-payment System for Content Sharing in P2P Networks", G. Chakraborty (Ed.): ICDCIT 2005, LNCS 3816 (11 pages), 297-307.
"Examination Report", EP Application No. 08 728 949.2-1871 (7 pages), dated Mar. 31, 2017.
Smart Card Alliance, "Transit and Contactless Financial Payments: New Opportunities for Collaboration and Convergence", Oct. 2006, 39 pages (Year: 2006).

* cited by examiner

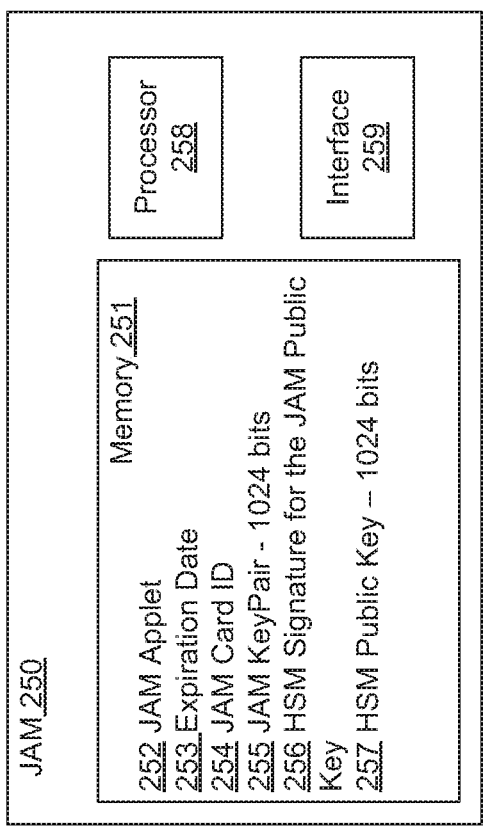
FIGURE 3A
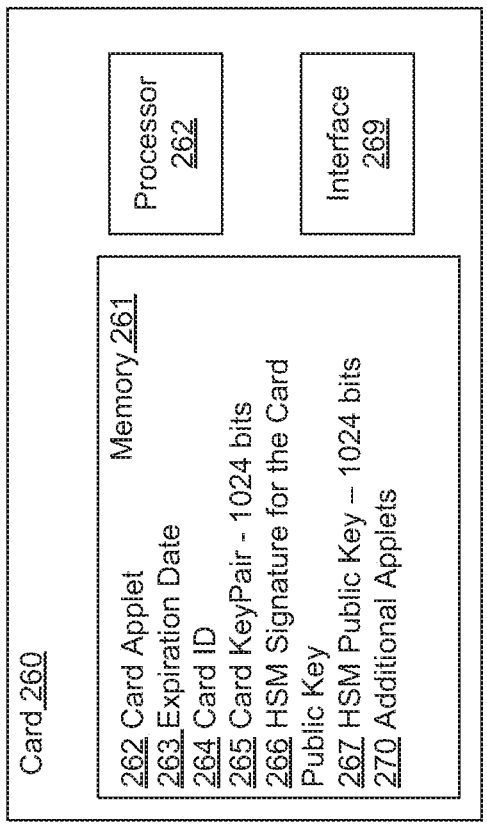
FIGURE 3B
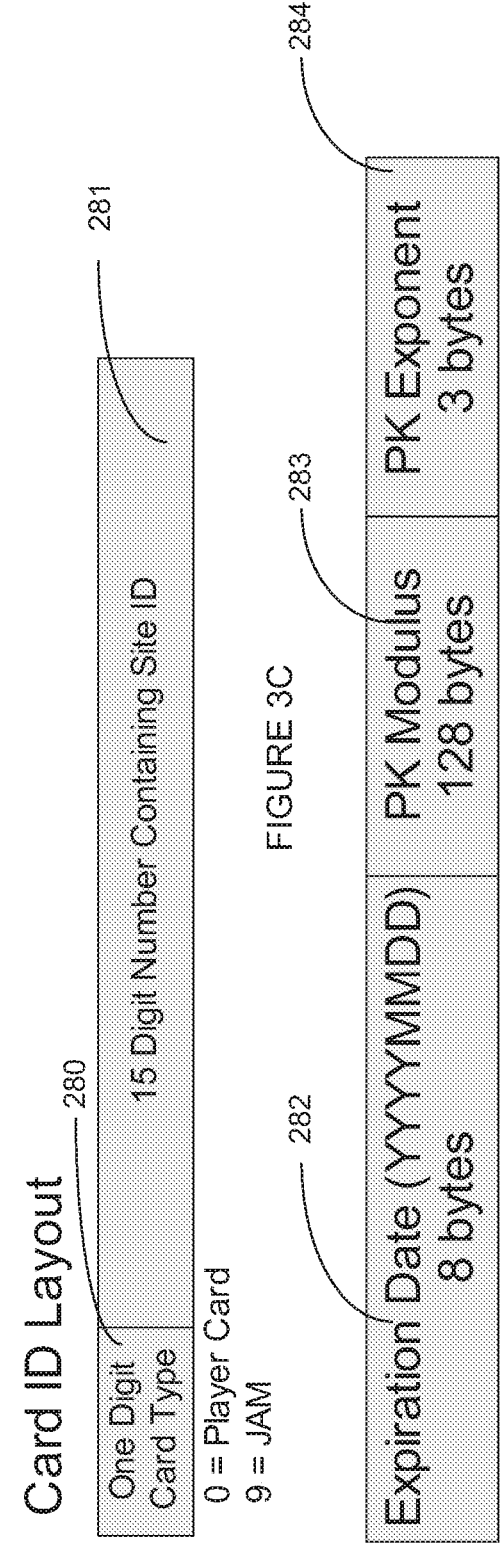
FIGURE 3C
FIGURE 3D

METHODS AND ARCHITECTURE FOR CASHLESS SYSTEM SECURITY

PRIORITY CLAIM

This application is a continuation of, claims priority to and the benefit of U.S. patent application Ser. No. 15/090,227, filed on Apr. 4, 2016, which is a continuation of, claims priority to and the benefit of U.S. patent application Ser. No. 13/765,327, filed on Feb. 12, 2013, now U.S. Pat. No. 9,324,209, which is a continuation of, claims priority to and the benefit of U.S. patent application Ser. No. 11/967,916, filed on Dec. 31, 2007, now U.S. Pat. No. 8,463,711, which claims priority to and the benefit of U.S. Provisional Patent Application No. 60/904,017, filed on Feb. 27, 2007, the entire contents of which are each incorporated by reference herein.

CROSS-REFERENCE TO RELATED APPLICATIONS

This application is related to the following commonly owned co-pending patent application: U.S. application Ser. No. 14/823,599, entitled "SECURE SMART CART OPERATIONS,".

TECHNICAL FIELD

The present invention relates generally to gaming devices and systems, and more specifically to security methods for gaming devices.

BACKGROUND

This invention relates to game playing services for gaming machines such as slot machines and video poker machines. More particularly, the present invention relates to methods of utilizing cashless instruments on gaming machines.

There are a wide variety of associated devices that can be connected to a gaming machine such as a slot machine or video poker machine. Some examples of these devices are lights, ticket printers, card readers, speakers, bill validators, ticket readers, coin acceptors, display panels, key pads, coin hoppers and button pads. Many of these devices are built into the gaming machine or components associated with the gaming machine such as a top box which usually sits on top of the gaming machine.

Typically, utilizing a master gaming controller, the gaming machine controls various combinations of devices that allow a player to play a game on the gaming machine and also encourage game play on the gaming machine. For example, a game played on a gaming machine usually requires a player to input money or indicia of credit into the gaming machine, indicate a wager amount, and initiate a game play. These steps require the gaming machine to control input devices, including bill validators and coin acceptors, to accept money into the gaming machine and recognize user inputs from devices, including key pads and button pads, to determine the wager amount and initiate game play. After game play has been initiated, the gaming machine determines a game outcome, presents the game outcome to the player and may dispense an award of some type depending on the outcome of the game.

As technology in the gaming industry progresses, the traditional method of dispensing coins or tokens as awards for winning game outcomes is being supplemented by ticket dispensers which print ticket vouchers that may be exchanged for cash or accepted as credit of indicia in other gaming machines for additional game play. An award ticket system, which allows award ticket vouchers to be dispensed and utilized by other gaming machines, increases the operational efficiency of maintaining a gaming machine and simplifies the player pay out process. An example of an award ticket system is the EZ pay ticket system by IGT of Reno, Nev. Award ticket systems and systems using other cashless mediums, such as smart cards, are referred to as cashless systems.

Cashless systems, such as the EZ pay ticket system, provide advantages to both game players and casino operators. For example, many players find it more convenient to carry an award ticket than a large number of coins. For gaming machine operators cashless systems tend to reduce gaming machine operating costs. For example, the infrastructure needed to remove and count indicia of credit (e.g. coins, tokens, bills) from the gaming machine may be eliminated or minimized when it is replaced with a cashless system, which reduces the gaming machine operating costs. Further, coin dust, which is potentially damaging to the components of the gaming machine (e.g. electronic components) may be eliminated or minimized when coin acceptors are replaced with the cashless system.

A concern in any cashless system is security. Typically, cashless instruments store a cash value that is ultimately redeemable for cash. Unfortunately, cashless instruments, such as printed tickets or smart cards, can be vulnerable to fraud in some instances, particularly where such instruments or systems of instruments are used in relatively simple formats or security architectures. A gaming entity, such as casino, that issues the cashless instrument can be liable for any cash that is obtained using the cashless instrument whether the cashless instrument is used in a valid or a fraudulent manner. While existing systems and methods for providing cashless instruments associated with gaming devices and gaming systems have been adequate in the past, improvements are usually welcomed and encouraged that reduce the potential and/or limit damages resulting from fraud. In light of the foregoing, it is thus desirable to develop methods and systems for preventing or reducing fraud and other potential problems associated with cashless instruments.

SUMMARY

Apparatus and method are described that enable secure transactions between a gaming devices, such as gaming machines, and portable devices, such as smart cards. The secure transactions may include a transfer of an amount of an indicia of credit with a cash value from the portable device to the gaming device or a transfer of an amount of an indicia of credit with a cash value from the gaming device to the portable device. A logic device placed in the gaming device may be operable to authenticate a portable device and authorize transactions involving transfers of indicia of credit between the portable device and the gaming device. The logic device may be operable to send authentication information relating to the portable device to a remote host where a value amount of one or more transactions involving the portable device, authorized by the logic device, may be higher when logic device and the remote host authenticate the portable device as opposed to when only the logic device authenticates the portable device.

One aspect of the present invention provides a gaming machine comprising: 1) a display device configured to output an outcome of a wager-based game played on the gaming machine; 2) an input mechanism operable to communicate with a portable device including a first processor and a first memory, said portable device operable to store a first amount of an indicia of credit transferable to the gaming machine; 3) a communication interface for communicating with a remote host; 4) a first logic device, including a second processor and a second memory, and 5) a master gaming controller comprising a third processor and a third memory.

The first logic device may be operable, to: 1) authenticate the portable device; 2) authorize a transfer of the first amount of the indicia of credit from the portable device to the gaming machine; 3) generate random information including a first public-private key pair; 4) provide information to the remote host that allows the remote host to authenticate the first logic device; and 5) provide information to the remote host that allows the remote host to authenticate the portable device. The master gaming controller including a second processor may be designed or configured to a) control a play of the wager-based game, b) generate the outcome of the wager-based game for display on the display device; c) to store the first amount of the indicia of credit and d) allow the first amount of the indicia credit to be utilized for one or more wagers on the wager-based game.

In particular embodiments, the master gaming controller may be further designed or configured to interrogate for the portable device unacknowledged transactions, receive information from the portable device relating to a first unacknowledged transaction, send the information relating to the first unacknowledged transaction to the remote host; receive a transaction acknowledgement from the remote host for the first unacknowledged transaction and send the transaction acknowledgement to the portable device.

In other embodiments, the first logic device may be further operable to authorize a transfer of a second amount of the indicia of credit stored by master gaming controller to the portable device. Also, the master gaming controller may be further designed or configured to send a request for the transfer of the second amount of the indicia of credit to the portable device to the first logic device where the master gaming controller is further designed or configured to deduct the second amount of the indicia of credit from a total amount of the indicia of credit stored on the gaming machine, when the transfer of the second amount is authorized by the first logic device. The first logic device may be operable to allow cashless transactions up to a first value involving the portable device when the portable device is authenticated only by the first logic device. Further, the first logic device may be operable to allow cashless transactions up to a second value greater than the first value involving the portable device when the portable device is authenticated by both the first logic device and the remote host.

Another aspect of the invention pertains to computer program products including a machine-readable medium on which is stored program instructions for implementing any of the methods described above. Any of the methods of this invention may be represented as program instructions and/or data structures, databases, etc. that can be provided on such computer readable media.

Aspects of the invention may be implemented by networked gaming machines, game servers and other such devices. These and other features and benefits of aspects of the invention will be described in more detail below with reference to the associated drawings. In addition, other methods, features and advantages of the invention will be or will become apparent to one with skill in the art upon examination of the following figures and detailed description. It is intended that all such additional methods, features and advantages be included within this description, be within the scope of the invention, and be protected by the accompanying claims.

BRIEF DESCRIPTION OF THE SEVERAL VIEWS OF THE DRAWINGS

The included drawings are for illustrative purposes and serve only to provide examples of possible structures and process steps for the disclosed inventive systems and methods for providing game services to remote clients. These drawings in no way limit any changes in form and detail that may be made to the invention by one skilled in the art without departing from the spirit and scope of the invention.

FIG. 3A-3D illustrate and components and information that may be available on a patron card and/or a JAM card.

DETAILED DESCRIPTION

Figure 1:
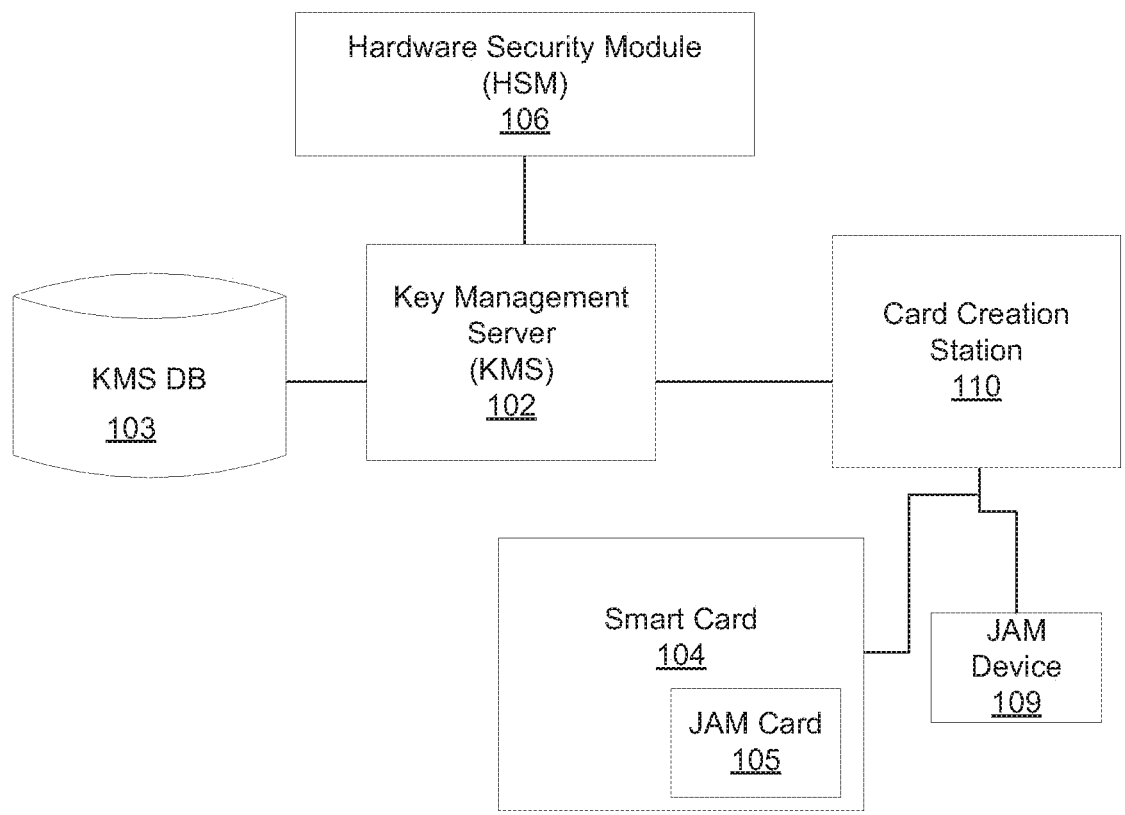
FIG. 1 illustrates system components associated with JAM/Patron card initialization and utilization.

Exemplary applications of systems and methods according to the present invention are described in this section. These examples are being provided solely to add context and aid in the understanding of the invention. It will thus be apparent to one skilled in the art that the present invention may be practiced without some or all of these specific details. In other instances, well known process steps have not been described in detail in order to avoid unnecessarily obscuring the present invention. Other applications are possible, such that the following example should not be taken as definitive or limiting either in scope or setting.

In the following detailed description, references are made to the accompanying drawings, which form a part of the description and in which are shown, by way of illustration, specific embodiments of the present invention. Although these embodiments are described in sufficient detail to enable one skilled in the art to practice the invention, it is understood that these examples are not limiting, such that other embodiments may be used and changes may be made without departing from the spirit and scope of the invention.

Although the present invention is directed primarily to gaming machines and systems, it is worth noting that some of the apparatuses, systems and methods disclosed herein might be adaptable for use in other types of devices, systems or environments, as applicable, such that their use is not restricted exclusively to gaming machines and contexts.

Such other adaptations may become readily apparent upon review of the inventive apparatuses, systems and methods illustrated and discussed herein.

One embodiment of the present invention considers utilization of a smart card used in a cashless system. The smart card may be carried by a player and utilized in conjunction various devices, such as a gaming machine, kiosk, cashier station, mobile game players and the like. The smart card may be operable to be credited or debited with cash, credits or other formats for representing something of tangible value from one or more of the devices for which it is compatible. The smart card may be utilized to obtain cash, game play, goods, services or other items of tangible value. The smart card embodiment is described for illustrative purposes and is not meant to limit the scope of the present invention. The functions of the smart card described herein may be implemented on any portable electronic device, such as a PDA, cell phone, key fob, etc. that emulates the memory and processing capabilities provided by a smart card.

In one embodiment, the portable electronic device carried by a patron may be a smart card enabled Java Card™. Java Card™ technology enables smart cards and other devices with very limited memory to run small applications, often called applets, that employ Java™ technology. It provides smart card manufacturers with a secure and interoperable execution platform that can store and update multiple applications on a single device.

Applets developed with Java Card™ technology may be configured run on any Java Card™ technology-enabled smart card, independently of the card vendor and underlying hardware. Java Card™ technology enables multiple applications to co-exist securely on a single smart card. New applications may be installed securely after a card has been issued, enabling card issuers to respond to their customer's changing needs dynamically. The Java Card™ API may be compatible with international standards for smart cards such as ISO7816, or EMV (Standard for interoperation of integrated circuit card derived from Europay, Mastercard and Visa.).

There are many manufacturers of Java Card™s. Examples of smart cards that may be utilized herein is provided by IBM (Armonk, N.Y.). IBM WebSphere Everyplace Chip Operating System, JCOP Edition is an implementation of several open smart card standards, such as Java Card™, GlobalPlatform, ISO (7816, 14443). JCOP (Java Card™) OpenPlatform) supports multiple hardware platforms, providing high-performance application execution on mid-to-low range, 8-bit smart-card chip platforms. All IBM JCOP editions have ROM memory free to contain a customer's standard applets, thus saving on expensive EEPROM. Free ROM for applet code varies between 16 kB and 56 kB.

The IBM Java Card™ Open Platform (JCOP) family is available in various editions. All comply with at least the mandatory features of the Java Card™ 2.2.1 and Global Platform 2.1.1 specifications. While specific editions may implement additional standards. Examples include, JCOP10, a DES, 3-DES and AES edition, JCOP20, an entry Public Key (RSA) edition, JCOP30, the entry, dual-interface (contact/contactless) edition, JCOP40/41, which adds a USB interface to the Java Card™ Open Platform 30 cards, JCOP21sim, which includes PK-enabled GSM SIM edition, JCOP21id, which includes the FIPS-compliant PK edition and JCOP3 lbio, which includes on-card biometry-enabled PK dual-interface edition of JCOP.I The JCOP31 bio combines a contactless interface with high-end cryptographic and biometry capabilities. Other configurations are possible—for example, with specific algorithms, such as appropriate cryptographic or biometric algorithms.

One aspect of the embodiments described herein pertain to preparing a portable device and components of a cashless system, such as a devices that are operable to interface with the portable device for use in the cashless system. The devices that interface with the portable device may be operable to receive and send information to the portable device including information that allows the portable device to be "credited" with or "debited" of cash or credit in a secure manner. A cashless gaming system and associated components that may utilize the apparatus and methods described with respect to FIGS. 1-8, is discussed with respect to at least FIGS. 9-12.

In FIG. 1, the initialization of a JAM (Java Access Module) 105 and a JAM device 109 (device including a JAM 105) are described with respect to embodiments of the present invention. The JAM 105 may be removable so that it can be placed in or be an integral component of a smart card 104 (also, referred to as a Java Card™) or other portable device as well as a non-portable device, such as a gaming machine (not shown). For instance, the JAM device 109 may be embedded in a non-portable device, such as a gaming machine.

During initialization, the Key Management Server (KMS) 102 may be used to record and/or assign security keys for use by the JAM Card 105 or the JAM device 109 using the Hardware Security Module (HSM) and KMS database (DB) as will be described as follows, such as with respect to FIGS. 2A and 2B. In one embodiment of the cashless system, after initialization of the JAM Card 105 and the JAM device 109, a player may be issued the smart card 104 including the JAM 105 and the JAM device 109 may be embedded in a cashless device, e.g., a gaming machine, such that the smart card 105 may be credited or debited at the device including JAM device 109.

When a smart card including a JAM card 105 and/or a device designed or configured to operate at least as a JAM 109 is employed, "card initialization" may refer to the process of preparing the JAM card 105 or the JAM device 109 for use. It may be a one-time process, i.e., the JAM card 105 may include hardware and/or software features that allow it to be initialized only once. In another embodiments, the JAM card 105 may be reinitialized multiple times. From a security perspective, both the JAM card 105 and the JAM device 109 may be initialized in the same way. Although, as will be described as follows, a JAM card for use in a smart card carried by a player and a JAM device 109 for use in a cashless device, such as a kiosk or a gaming machine, may utilize different applets. The JAM initialization process for various embodiments are illustrated in the sequence diagrams below.

Figure 2A:
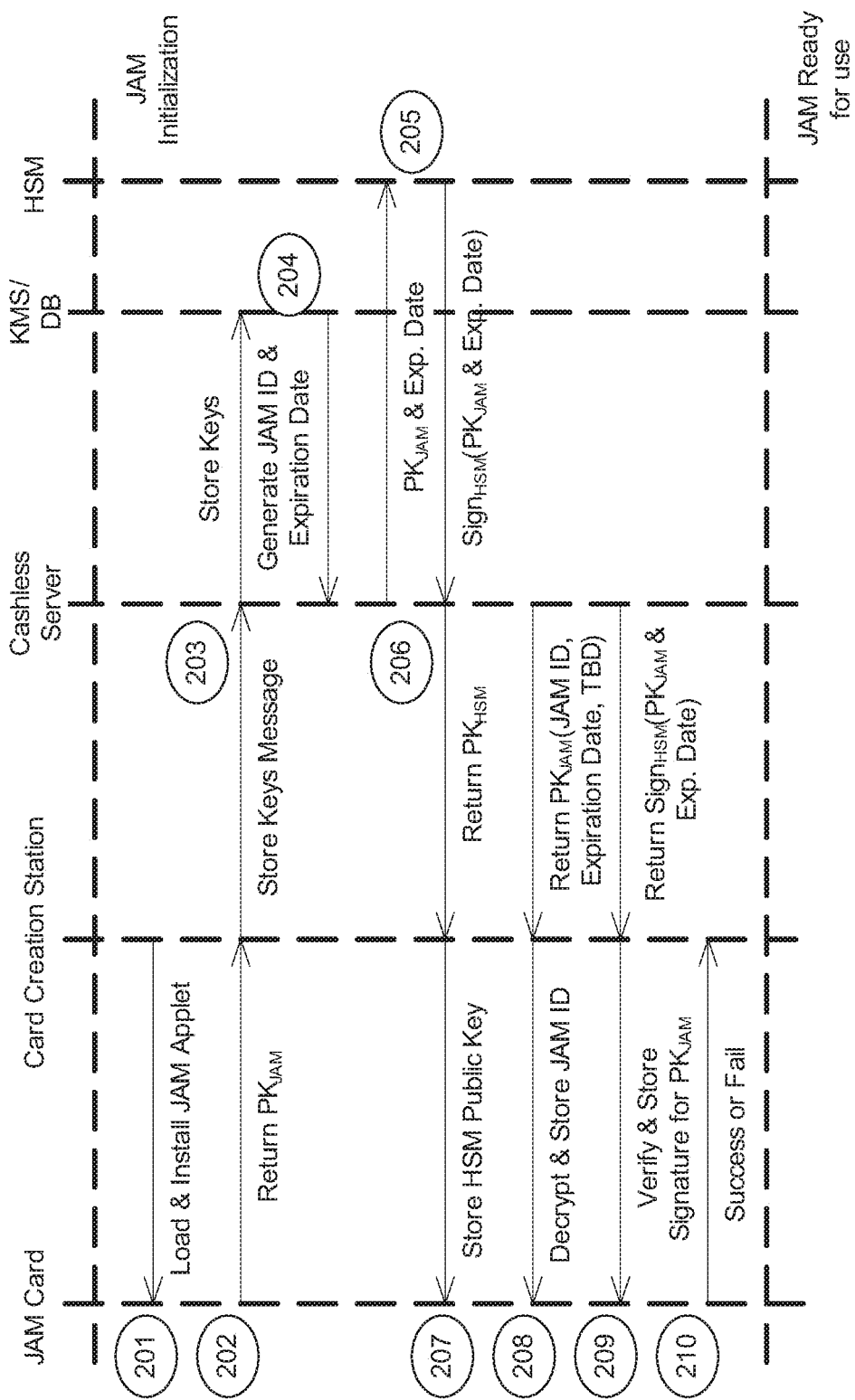
FIG. 2A illustrates a JAM initialization sequence.
Figure 2B:
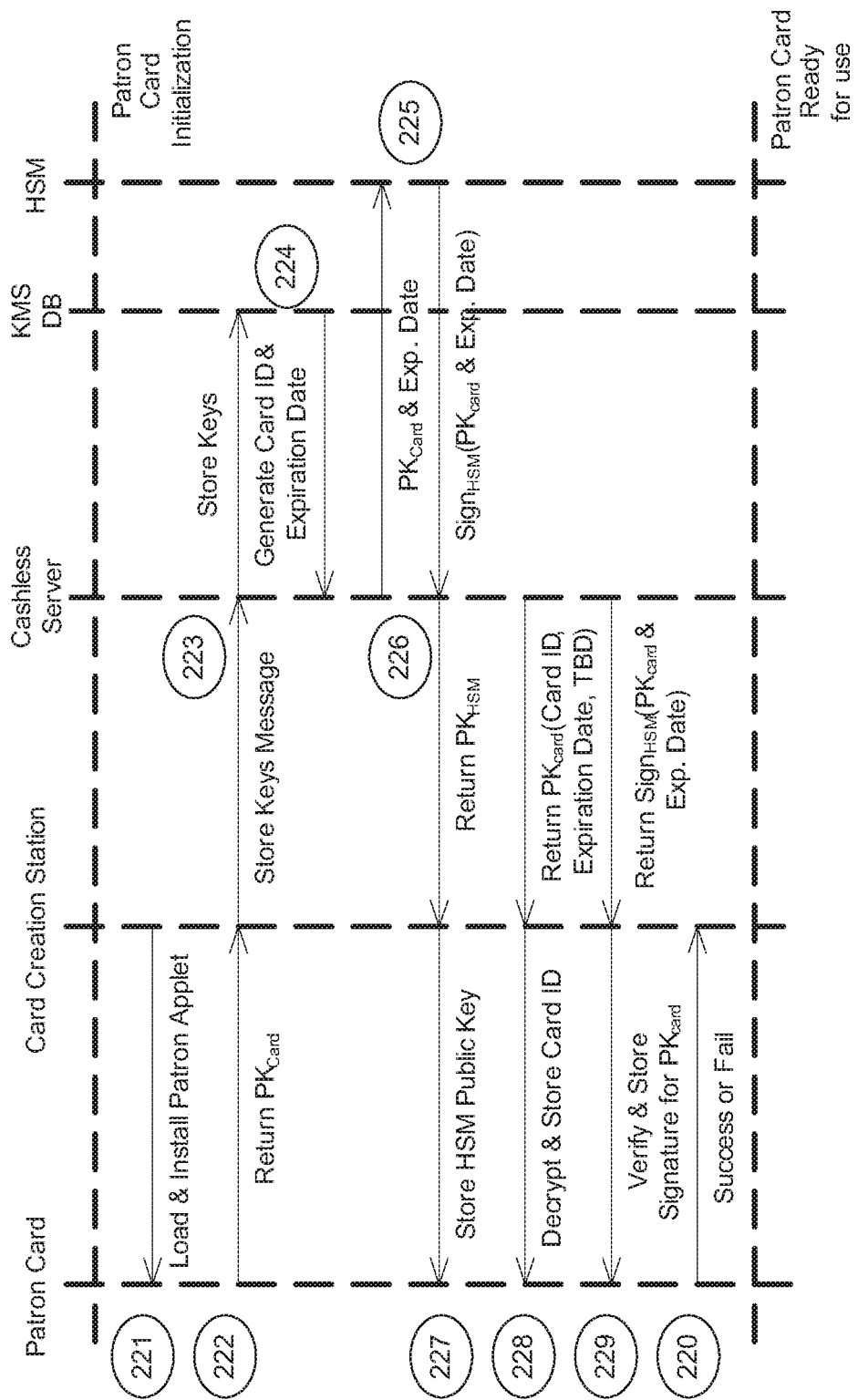
FIG. 2B illustrates a patron card initialization sequence.

FIG. 2A is a JAM initialization sequence diagram for one embodiment of the present invention. The initialization includes interactions between JAM device (e.g., see 109 in FIG. 1), a card creation station (e.g., see 110 in FIG. 1), a cashless server (e.g., see 410 in FIG. 12), a KMS including the KMS DB and an HSM (e.g., see 102, 103 and 106). The JAM may be embodied as a card may be similar to a sim card used in a cell phone and is referred to as a JAM card in FIG. 2A. The JAM device 109 in FIG. 1 may be embodied as a device similar to a sim card. The JAM card after initialization may be placed in a device, such as a gaming machine or a cashier terminal and used to verify patron cards (See FIG. 3, for initialization of patron card, such as smart card 104 in FIG. 1).

In 201, at least one applet is loaded on the JAM. A JAM may simultaneously run multiple applets. The card/JAM creation station may store multiple applets. The applets may be downloaded to the card creation station from a remote device, such as the KMS. In 202, the JAM creates a public-private key pair, such as 1024 bit length key, and sends the public key of the JAM ($PK_{JAM}$) to the cashless server via the card creation station. In 203, the cashless server stores the public key of the JAM ($PK_{JAM}$) and sends the public key information to the KMS. In one embodiment, the cashless server and the KMS/KMS DB may be embodied in the same device. In other embodiments, multiple cashless servers may communicate with a single KMS/KMS DB.

In 204, the KMS may store the keys and may return to the cashless server one or more of the following: a) a new, unique, JAM ID (identification), b) a JAM creation date, c) a JAM expiration date, d) other information used to identify the JAM in subsequent transactions handled by the cashless server and e) combinations thereof. In 205, the cashless server may send the public key of the JAM and the JAM expiration date to the HSM. This data is signed with the HSM public key. Then, the HSM decrypts 1024 bit public key of the JAM and the JAM expiration date using its private key and may apply a one way algorithm, such as a hash function, to the JAM public key and the expiration data to generate a first bit value. This first bit value may be signed with the HSM private key. The HSM may return the first bit value signed with the HSM private key to the cashless server ($Sign_{HSM}(PK_{JAM}$ & Exp. Date)).

In general, the first bit value may be derived from any set of information that is commonly known and independently communicated to the JAM card and the HSM. For instance, in FIG. 2A, the expiration date is independently sent to the HSM and the JAM card by the cashless server. The JAM card public key is known to the JAM card and the cashless server sends the public key of the JAM to the HSM. Obviously, other information or additional information other than the expiration date may be sent to the JAM card and the HSM.

In 206, the cashless Server may return a) the public key of the HSM, b) the JAM ID and the expiration date signed with the public key of the JAM and c) the first bit value derived from public key of the JAM and the expiration date signed with the private key of the HSM to the card creation station. The card creation station may store the data that has been returned as a record of the initialization process performed at the station or some other information as a record of the JAM initialization.

In 207, the JAM decrypts the JAM ID and the expiration data using its private key and stores the public key of the HSM, the JAM ID and the expiration date. The JAM may be configured to perform this operation only one time so that its JAM ID and expiration date can't be later changed. Next, in 208, the JAM decrypts the signature derived from the public key of the JAM using the HSM public key. In 209, the JAM then applies a one-way algorithm to the public key of the JAM ($PK_{JAM}$) and the expiration date decrypted using the private key of the JAM to derive a second bit value. In 210, when first and the second bit value match, a success may be reported to the card creation station. When they don't match an error message may be generated and the card initialization will fail.

In one embodiment, the patron card initialization is similar to the JAM initialization method above. FIG. 2B is a patron card initialization sequence diagram for one embodiment of the present invention. The patron card may include a logic device similar to a SIM card. The type of logic device used in the patron card may be the same or different as the logic device used for the JAM device in FIG. 2B.

In 221, at least one applet is loaded on the patron card. A patron card may simultaneously run multiple applets. The number and type of applets loaded for the patron card may be different than the number and type of applets for the JAM card described with respect to FIG. 2B. The patron card/JAM creation station may store multiple applets. The applets may be downloaded to the card creation station from a remote device, such as the KMS.

In 222, the patron card creates a public-private key pair, such as 1024 bit length key, and sends the public key of the patron card ($PK_{card}$) to the cashless server via the card creation station. In 223, the cashless server stores the public key of the patron card ($PK_{Card}$) and sends the public key information to the KMS. In 224, the KMS may store the keys in the KMS DB and may return to the cashless server one or more of the following: a) a new, unique, Card ID (identification), b) a Card creation date, c) a Card expiration date, d) other information used to identify the Card in subsequent transactions handled by the cashless server and e) combinations thereof. In 225, the cashless server may send the public key of the Card and the Card expiration date to the HSM. This data is signed with the HSM public key. Then, the HSM decrypts 1024 bit public key of the patron card and the card expiration date using its private key and may apply a one way algorithm, such as a hash function, to the patron card public key and the expiration data to generate a first bit value. This first bit value may be signed with the HSM private key. The HSM may then return the first bit value signed with the HSM private key to the cashless server ($Sign_{HSM}(PK_{Card}$ & Exp. Date)).

In 226, the cashless Server may return a) the public key of the HSM, b) the Card ID and the expiration date signed with the public key of the Card and c) the first bit value derived from public key of the patron card and the expiration date signed with the private key of the HSM to the card creation station. The card creation station may store the data that has been returned as a record of the initialization process performed at the station or some other information as a record of the patron card initialization.

In 227, the JAM decrypts the card ID and the expiration data using its private key and stores the public key of the HSM, the card ID and the expiration date. The patron card may be configured to perform this operation only one time so that its Card ID and expiration date can't be later changed. Next, in 228, the patron card decrypts the signature derived from the public key of the card using the HSM public key. In 209, the patron card then applies a one-way algorithm to the public key of the patron card ($PK_{Card}$) and the expiration date decrypted using the private key of the patron to derive a second bit value. In 220, when first and the second bit value match, a success may be reported to the card creation station. When they don't match an error message may be generated and the card initialization will fail. After the initialization process the JAM is ready to be placed into a cashless device, such as but not limited to a gaming machine, kiosk or a cashier station and the patron card is ready to be issued.

FIG. 3A below shows the authentication related elements that may exist on both a patron card 260 and a JAM card 250 after initialization for one embodiment. In the embodiment below the JAM and Patron card store similar fields of data in regards to security and authentication. The JAM 250 and patron card 260 don't necessarily have stored the same fields of data. For instance, a JAM 250 may contain extra information used for security and authentication purposes. In another example, a patron card 260 may store additional applets 270 that are customized to a particular player, such as applets for bonusing, promotions, free or discounted merchandise, etc.

A description of each element follows on the JAM 250 and patron cards 260 are as follows. Some of these elements are described with respect to FIGS. 2A and 2B. The JAM 250 may include a processor 258, at least one memory 251 and interface 259. The interface 259 may provide one or more of a power interface, a communication or both. The memory may be operable to store one or more of a 1) a JAM applet 252, which may be an instance of the applet that contains the JAM logic for cashless transactions, 2) an expiration date 253, 3) a JAM ID 254, 4) a JAM public-private key pair 255, which may be 1024 bits, 5) an HSM signature for the JAM public key 256, 6) an HSM public key 257, 7) additional security information and applets (not shown) and 8) applets that allow for other types of transactions (not shown).

The patron card 260 may include a processor 260, at least one memory 261 and interface 269 provide in a portable substrate or as a component of another portable device. The interface 269 may provide one or more of a power interface, a communication interface or both. The memory 261 may be operable to store one or more of a 1) a patron applet 262, which may be an instance of the applet that contains the card logic for cashless transactions, 2) an expiration date 263, 3) a card ID 264, 4) a card public-private key pair 265, which may be 1024 bits, 5) an HSM signature for the card public key 266, 6) an HSM public key 267, 7) additional security information and applets (not shown), such as biometric applications when the card 260 includes biometric capabilities, and 8) applets that allow for other types of applications 270, such as but not limited to bonusing or promotions. The patron card and/or JAM card may be operable to generate random numbers for the purposes of generating a random key pair as well as random numbers or other random data (e.g., random letters, random symbols). This capability may be encoded in or more applets or may be part of the cards firmware.

The HSM signature may be (128 bytes) of the JAM's or patron card's signed public key & expiration date. The key pair for the JAM or patron card may be a 1024 bit key that is used for secure communication between devices. Each instance of the applet may create a key pair (Public, Private) just after installation. The HSM Public Key ($PK_{HSM}$) may be stored in all smart cards or similarly enabled devices. It may be used when exchanging data with the HSM and may be used for verifying the Public Key signatures of other cards. In one embodiment, when the HSM Public Key is changed, then all previously issued cards or JAM's storing the HSM public key may no longer be used unless their information is updated. As previously described, a JAM or patron card may be assigned a unique id that may be used as a reference in the Cashless key management database KMS DB. As shown in FIG. 3C, the Card or JAM id may be an 8 byte BCD number that consists of a one digit card type 280 and a 15 digit unique identifier 281. A portion of the 15 digit number in the Patron Card or JAM ID may include information that allows the site to be identified. This allows approximately 2^45 (35,184,372,088,832) unique card IDs per card type, per site. As shown in FIG. 3D, the expiration date 282 may be stored as 8 bytes in format of a four digit year, two digit month and two digit day. The public key of the card may be stored as a 128 bytes modulus 283 and an exponent of 3 bytes 284.

After the initialization process is complete, an entry may exist in a card table for a given card (JAM Card or Patron Card). The patron card table may contain security related elements that are similar to the JAM card table, but it may also contain several fields related to the purse. The following tables show security related elements that may exist in the JAM card table and the Patron Card table after initialization for various embodiments. These examples are provided for illustrated purposes and are not meant to limit the scope of information that may be stored in a record associated with a JAM Card or a Patron Card. This record may be stored in the KMS DB or another database associated with the cashless server.

TABLE 1

JAM Card

| Field | Definition |
|---|---|
| creationDate | The registration date of the card |
| expirationDate | The expiration date of the card |
| cardID | The ID of the card. This ID is unique, and may be passed, for bandwidth reasons, instead of the 128 byte public key of the card. |
| Status | The last known status of the card |
| publicKey | The public key of the JAM. |
| lastAuth | The date/time of the card's last successful authorization |
| Additional data fields | To be determined (e.g., ID information related to device in which Card is placed, time of installation, location where card was initialized, information related to person that installed card) |

TABLE 2

Patron Card

| Field | Definition |
|---|---|
| creationDate | The registration date of the card |
| expirationDate | The expiration date of the card |
| cardID | The ID of the card. This ID is unique, and may be passed, for bandwidth reasons, instead of the 128 byte public key of the card. |
| status | The last known status of the card |
| publicKey | The public key of the JAM. |
| lastAuth | The date/time of the card's last successful authorization |
| Additional fields | To be determined (e.g., user id information, biometric information, location where card is created, person that initialized card, amount of credits associated with card, credit limit) |

Figure 4:
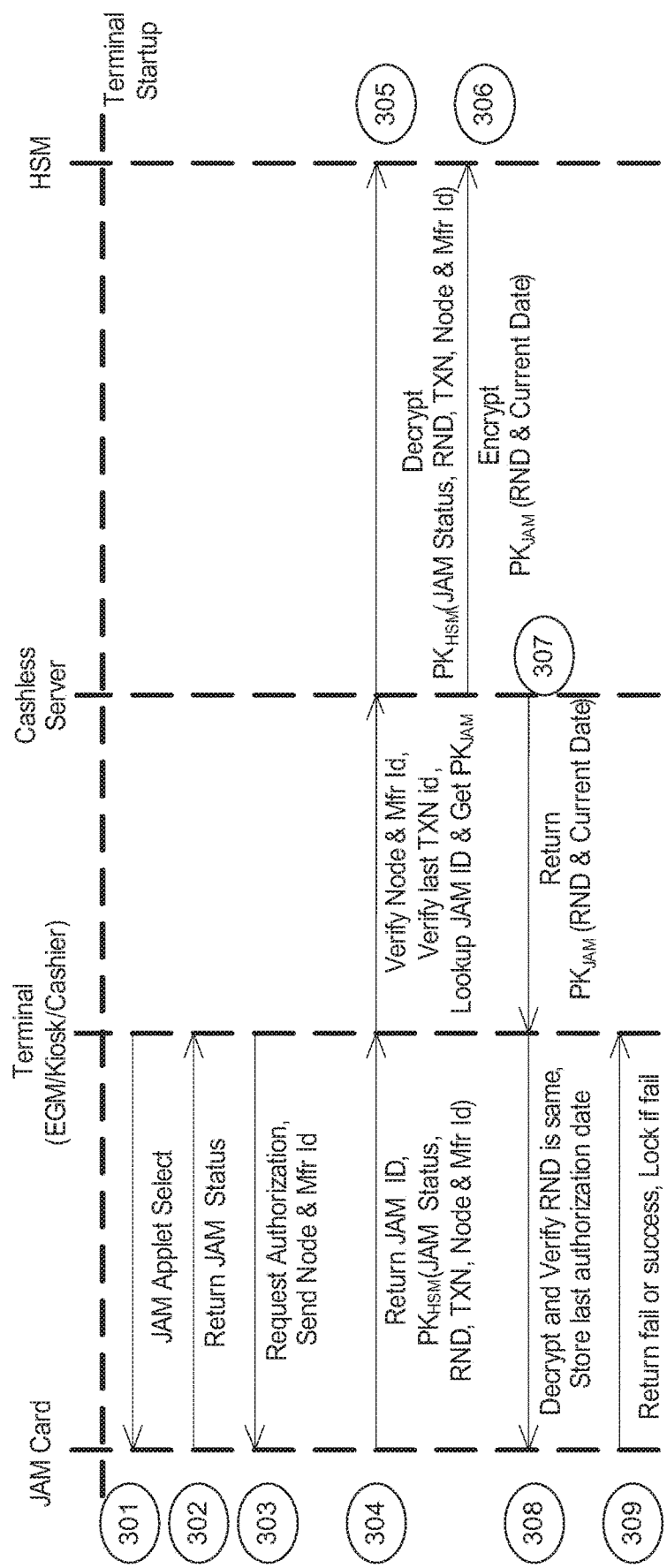
FIG. 4 illustrates a sequence diagram of the JAM authentication process.

FIG. 4 illustrates a sequence diagram of the JAM authentication process for one embodiment of the present invention. After a gaming device, such as an electronic gaming machine (EGM, kiosk, change station, cashier station), coupled to a JAM card, performs its regular initialization and signs on to the casino's network, it may authenticate the JAM before it can perform any smart card transactions, i.e., transactions involving a patron card. In particular, before a JAM may function in a gaming device, it may need, in one embodiment, to be online and properly authenticated via the KMS or other device that stores information that allows the JAM to be authenticated.

In one embodiment, the JAM coupled to a gaming device may be configured such that it will not operate without authentication. Further, the JAM may treat the gaming device to which it is coupled as an untrustworthy device and may not trust information received from the gaming device unless information is available that allows the JAM, to authenticate/verify information that it may receive from the device.

In 301, the terminal, which provides cashless functions in conjunction with a JAM, may connect to the JAM card and select the JAM applet. A logic device on the terminal and separate from the JAM, such as a master gaming controller on a gaming machine or a processor associated with a Kiosk/Cashier station, may initiate the connection. As previously noted, the JAM card may be operable to execute multiple applets. In response, in 302, the JAM applet, executed on the JAM card, may return its current status. If the JAM returns the code for card unusable, the terminal may take appropriate action to disable cashless play on the terminal.

In the case of a gaming machine, the gaming machine may enter a tilt state and generate a message and/or change a status of its interface (e.g., flash lights) to draw attention to its status. In another embodiment, the gaming machine may enter an operation state without cashless capabilities. For example, in the case of a gaming machine that allows cash/cashless play, the gaming machine may operate in a cash-only state. Again, the gaming machine may be operable to change its interface in some way and generate a message that allows its status to be communicated to an attendant.

In 303, after determining the JAM card is usable the terminal may then request the authorization cycle to begin. The terminal may send information, such as its node, manufacturer ids, serial numbers, etc. to the applet, executed on the JAM, as part of the request. In 304, the JAM card may return its Card ID (see Table 1) and cipher text containing one or more of a random value, node and manufacturer ids of the terminal, a transaction count or a transaction ID for the last transaction it performed to the terminal. In some embodiments, information from multiple transactions may be stored and transmitted to the terminal for authentication purposes. A portion of the information sent to the cashless server may be encrypted with the public key of the HSM. For instance, one or more of the card status, random value, transaction count, node, manufacturer ID or the last transaction ID may be encrypted with public key of the HSM. The terminal may then pass this data including the card ID and data encrypted with the public key of the HSM to the cashless server. For a newly initialized JAM card, the information related to the transaction count and last transaction ID may be created when it is initialized and may be stored on the JAM card and the cashless server (or other device that stores the initialization information associated with each JAM card or patron card) (see at least FIGS. 2A and 2B).

In 305, using the JAM ID it has received, the cashless server may look up data corresponding to the card id stored on the cashless server. For instance, this information may be stored in the KMS DB. All or a portion of the needed information may be stored on another device. Thus, in some instances, the cashless server may send a request for this information to another device in communication with the cashless server, such as the KMS. This information may be used, in some embodiments, to verify that the JAM card is good and is not expired. The cashless server, or another device, may have stored information relating to the JAM ID during the JAM initialization process (see at least FIG. 2A). Further, transactional information may be stored or may be accessible to the cashless server that is generated during use of the JAM for various transactions.

In some embodiments, the JAM card may be re-authenticated after a period of use. One or more of the JAM card, the terminal or the cashless server may be operable to initiate a re-authentication of a JAM card prior to allowing transactions involving the JAM card to proceed. The JAM card, terminal and/or the cashless server may store information generated during the last authentication process and this may be passed between the JAM card, terminal and/or cashless server during the authentication process.

In 306, he cashless server may send information encrypted with the HSM public key to the HSM, which decrypts the information, such as the random value, node and manufacturer id using its private key. The HSM may be a component of the cashless server or a component of a separate device. The information in the message may then be verified to determine that it did come from that registered device. The verification process comprises decrypting information signed with the public key of the HSM using the private key of the HSM. The HSM may generate a message indicating whether the terminal is a valid device or not.

In 305 and/or 306, the cashless server may also check the last transaction id to verify they match and that there are no missing transactions from the JAM card. When it is determined that the registered device is not valid, then remedial action, such as disabling cashless transactions on the terminal or not recognizing cashless transactions from the terminal may be performed and an operator may be notified.

In 307, the cashless server may then encrypt the same random data and the current date with the public key of the JAM. Then, in 307, the cashless server may return the encrypted message to the terminal, which then sends it to the JAM for authentication, via the terminal. In 308, when the JAM receives the encrypted information, such as the random value originally generated by the JAM, it may decrypt the random value and verify that it is the same as sent. In one embodiment, the included date may be stored as its last authorization date.

In 309, when the random number matches the number it sent then the JAM assumes that it has been authenticated with the KMS and it will allow use of the other card instructions. If the check fails then the JAM may decrement a global counter. When the global counter reaches zero the applet may terminate the card manager on the card disabling the JAM. In one embodiment, the JAM may allow a single bad verification before locking the applet. An advantage of this approach is that the possibility of a brute force attack where an attempt to guess what information that the JAM is expecting is greatly reduced since only one wrong guess is allowed. In other embodiments, after a certain number of transactions and/or an expiration period has elapsed the JAM may disable itself and then may require re-authentication as shown in FIG. 4. In this embodiment, the JAM may initiate the authentication process as opposed to the terminal.

Figure 5:
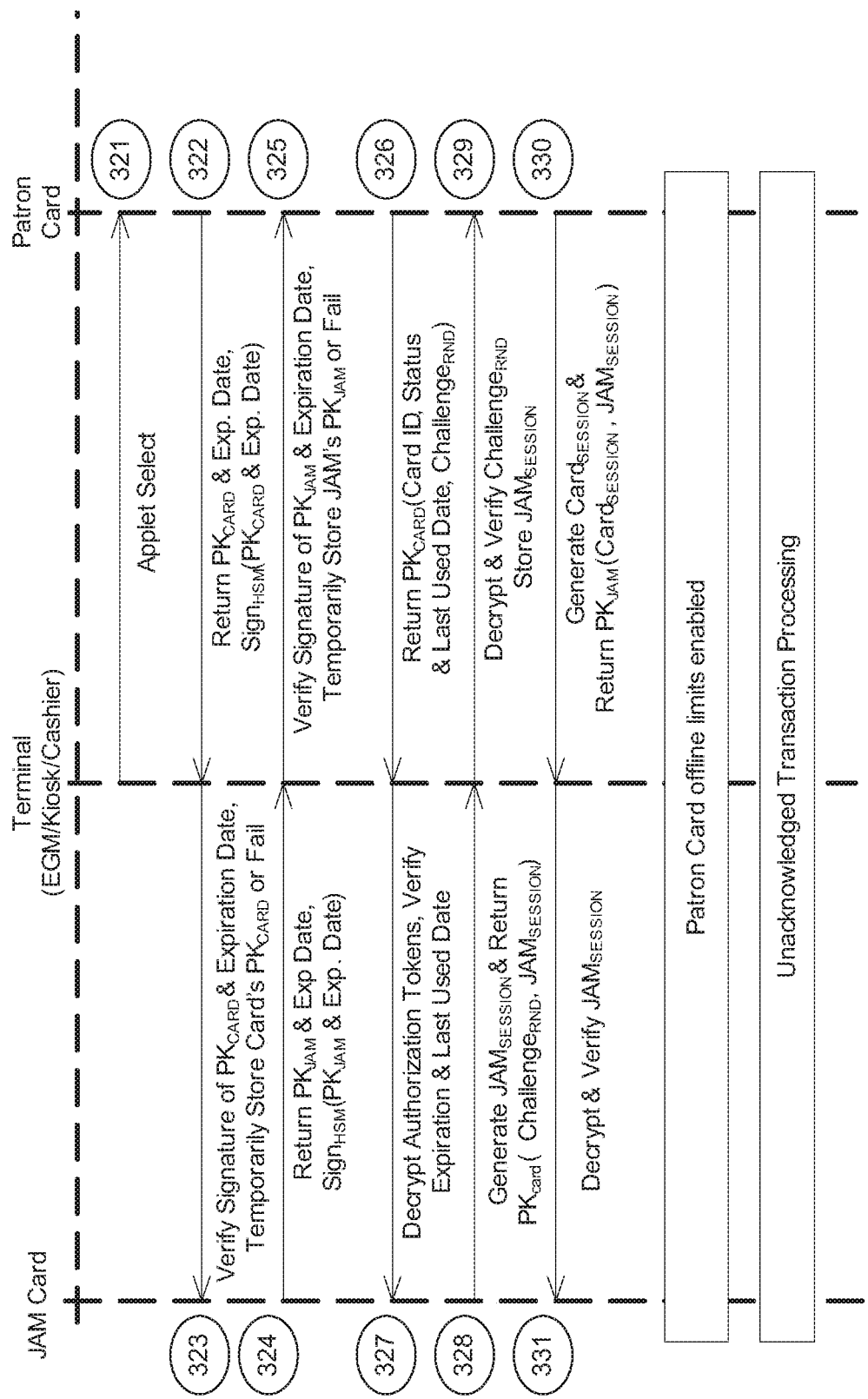
FIG. 5 illustrates the sequence diagram of the Patron Card authentication to an authenticated JAM.
Figure 6:
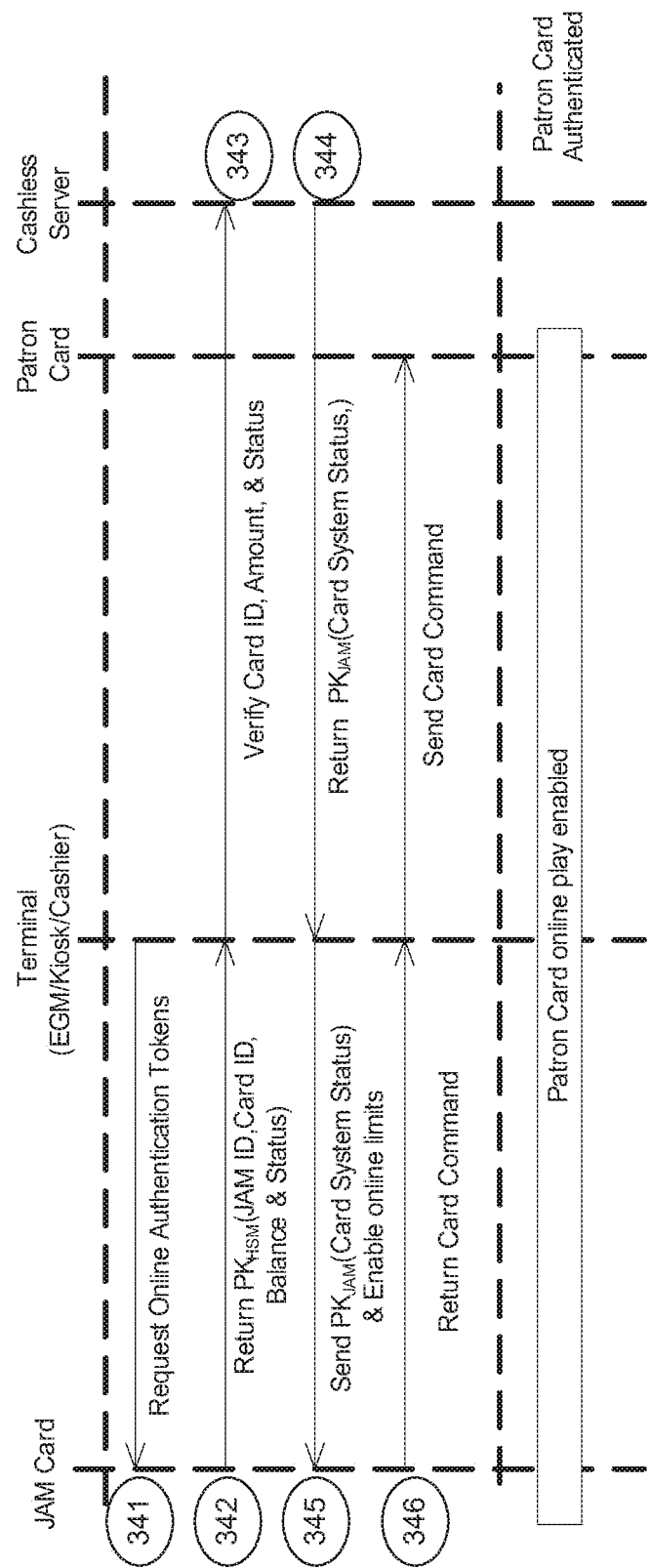
FIG. 6 illustrates the sequence diagram of the Patron Card Authentication to a cashless server.

In FIGS. 5 and 6 sequence diagrams relating to authentication of a patron card are shown for embodiments of the present invention. In a particular embodiment, a patron card may not be used until it is authenticated with an authorized JAM (A JAM that has been authorized is described with respect to FIG. 4). In one embodiment, once a JAM has been authenticated, it is may be authorized to act on behalf of a cashless server for offline transactions. As a result, a terminal coupled to a JAM may not need to be in communication with a cashless server that utilizes information stored in the KMS DB and provides information to the HSM to enable card authentication. At a minimum, however, the terminal may need to be connected to an authenticated JAM, such as a JAM embedded in the terminal.

In one embodiment, a patron card authentication may be a two-step process. First, the card may be authenticated to an authenticated JAM, and then the patron card may be authenticated against the cashless server when it is available. Thus, a transaction involving a patron card may proceed after authentication by the JAM and the cashless server or after authentication only by the JAM. The level of authentication needed to allow a transaction to proceed may depend on the type of transaction. For example, a bonusing transaction or a promotional transaction may require a lower level of authentication in some instances then a transaction that allows funds to be deducted using the patron card.

When the cashless server is not available, and the patron card is successfully authenticated to the JAM, then processing may continue within the boundaries of offline limits specified for the transaction type. The off-line limits may be customer specific. For instance, some patron cards associated with a specific customer may be granted higher off-line limits for cashless transactions then other patron card. In other embodiments, the off-line limits for all patron cards may be the same.

In an off-line mode, the cashless server may be updated by the JAM with off-line transaction information when communications are later established with the cashless server. In some embodiments, the JAM cards associated terminal may be operable to periodically communicate with a cashless server rather than attempting to remain in constant communication with the cashless server. In an off-line mode, an authenticated JAM may be authorized to perform transactions that involve crediting or debiting a patron card.

The off-line limits may be applied on a per-card basis or a transaction basis. Thus, each card may be limited to a number of off-line transactions, which may add to a particular value, such as $300 limit per card or the JAM may be operable to only authenticate a number of transactions up to a certain value independent of the number patron cards used to a certain value. For example, after $300 is debited from a single card, the JAM may not be allowed to perform additional transactions using that card or after $300 worth of transactions involving a plurality of cards the JAM may not be allowed to continue transactions. The off-line limits may include both per card limits and transaction limits. For instance, up to $100 limits per card and no more than $1000 dollars worth of transactions involving a plurality of patron cards.

FIG. 5 illustrates the sequence diagram of the Patron Card authentication to an authenticated JAM for one embodiment of the present invention. In 321, a patron card may be inserted into the terminal or placed in a position, such as for a wireless communications, which allows information to be transferred between the patron card (or other portable device) and the JAM. In 321, after communications are established, the terminal connects to the card and selects the cashless applet. As previously noted, the patron card may store and execute other applets to allow it to perform additional transactions, such as transactions related to bonusing, player tracking, promotions, etc.

The communications between the JAM card, terminal and patron card may be through a communication interface associated with the terminal to which the JAM card is coupled. For instance, a gaming machine may include a wireless interface or other patron card interface under control of the master gaming controller. After receiving information the patron card, the master gaming controller may relay the received information from the patron card to the JAM. In other embodiments, the JAM may be part of device, such as a card reader that receives information from the patron card and then relays it to both the master gaming controller on a gaming machine and the JAM card. In yet other embodiments, the JAM card may directly control the interface and/or may receive information directly from the patron card, such as via wireless communications and then send a copy of the received information to the master gaming controller and may also receive communications from the master gaming controller that are to be relayed to the patron card.

In 322, the patron applet may return its public key & key signature. In 323, the JAM may verify the card key signature and stores the public key in transient memory. In 324, when the verification is okay it may return its public key and signature to the patron card. When the verification fails, the JAM may purge the card's public key and signature from memory and return an error. The JAM may not lock up as it's been authorized by the KMS to perform cashless transactions.

In 325, the patron card may verify the JAM's key signature and expiration date. If the key signature fails the patron card may decrement its authorization counter. An operator may select the number to which the authorization counter may be initially set. When the counter reaches zero the patron card may change its internal state to lock and may require a cashier to unlock. Card diagnostics may be used to determine the cause of the problem, including which JAM ID and node id the card was placed in when the authentication failed.

In 326, when the verification succeeds, then the patron card may return one or more of the following encrypted with the JAM's public key: a) card id, b) a status, c) a last used date, d) a challenge random value, e) a current balance, f) a credit, g) a debit or h) combinations thereof. In 327, the JAM may decrypt information, such as the patron card's id, status and last used date. The JAM may then verify that the patron card's status is okay and has not expired. In 328, when the verification is okay, the JAM may return an internally generated random value, a $JAM_{SESSION}$ value, and the challenge random value encrypted with the patron card's public key.

In 329, the patron card may decrypt the challenge random number, verify it, and then store the $JAM_{SESSION}$ value. In 330, the patron card may generate a $Card_{SESSION}$ value and may return it and the $JAM_{SESSION}$ value encrypted with the JAM's public key. The card may internally build the temporary session key (i.e., utilizing its random number generating capabilities. In 331, the JAM may decrypt and verify the $JAM_{SESSION}$ value and internally build a temporary session key.

At this point the patron card is operating with its offline limits enabled because the cashless server and/or HSM have not been contacted. For cashless transactions, the offline limits may govern the amount of value that may be credited or debited from the patron card. A process by which the off-line limits may be removed is described with respect to FIG. 6.

FIG. 6 illustrates the sequence diagram of the Patron Card Authentication to a cashless server for one embodiment. In 341, the terminal may request the JAM card to get the secure online authentication tokens, which includes the patron card's balance, status and other additional information. In 342, the JAM Card may return this information encrypted with the HSM's public key. In 343, the terminal may send the information from the JAM to the cashless server to secure online status. The Cashless server may send the information signed with the HSM's public to the HSM to be decrypted.

In 344, the Card ID and JAM ID may then be verified, the patron card status may be checked as well as its balance and other information. The status of the patron card determined by the system may be encrypted with the public key of the JAM. The patron card status may be the current status of the patron card as determined by the cashless server. In 344, the systems card status may be returned to the terminal. In 345, the JAM card may be sent the patron card status as determined by the system. In 346, the JAM may return a patron card command to the patron card. At this point a secure session may be established and application level processing may begin.

Figure 7:
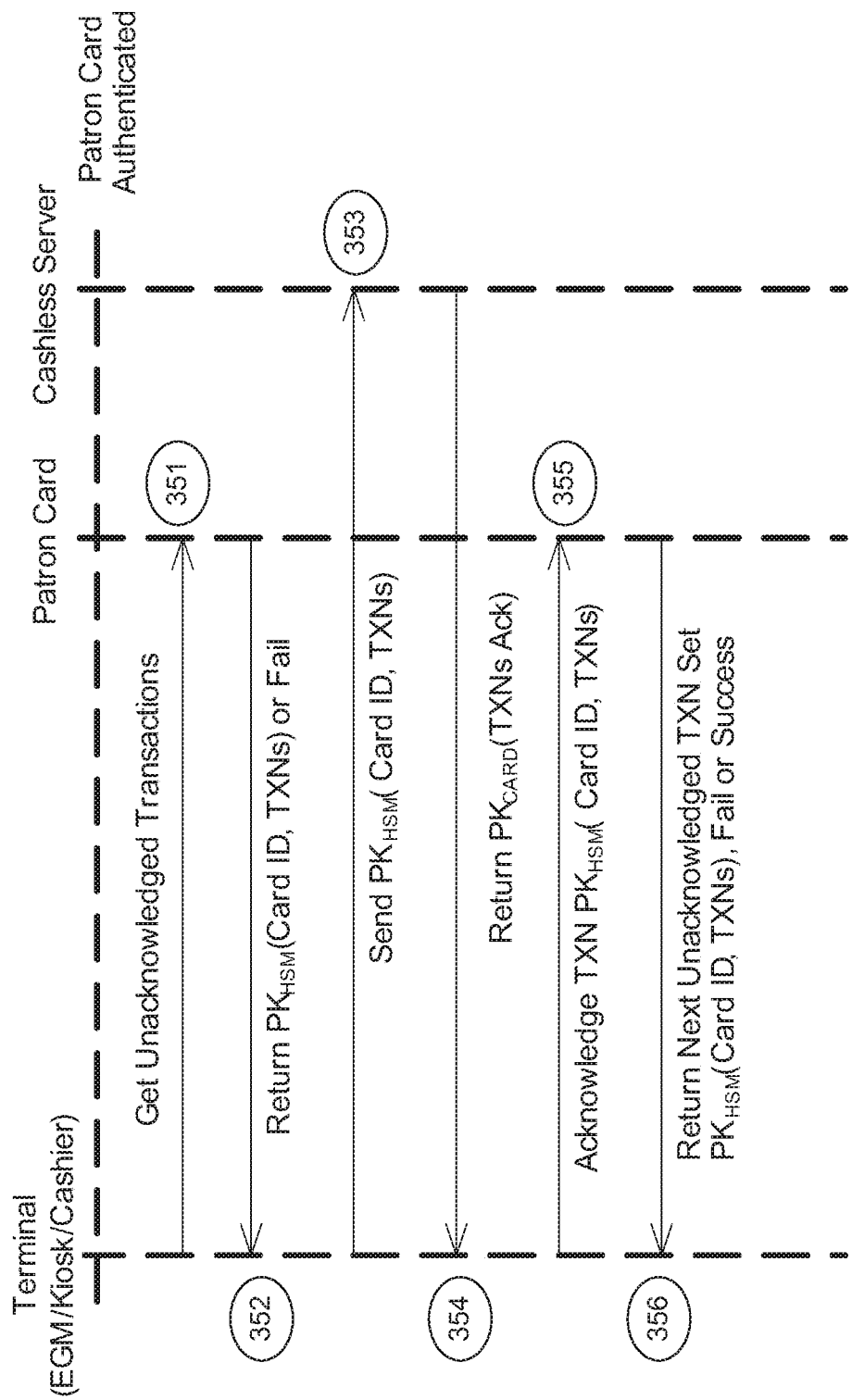
FIG. 7 illustrates a sequence related to patron card transaction processing.

FIG. 7 illustrates a sequence diagram related to patron card transaction processing for one embodiment. When the patron card gets inserted and after the card has been authenticated. The terminal may check for any unacknowledged transactions. In one embodiment, all unacknowledged transactions are sent to the cashless server before the patron card may change its state to online processing. The cashless server may check the unacknowledged transactions for irregularities and store the unacknowledged transactions. In 351, the terminal may request unacknowledged transactions from patron card. In 352, the patron card may return encrypted data including transaction information or success status with no data if no outstanding transactions are stored on the patron card. In 343, the terminal may then send the encrypted data including the transaction information to the cashless server. In 354, the cashless server, using the card id, may look up the public key for this card, encrypt the transaction acknowledgement and then returns this data to the terminal. In 355, the terminal may then send this acknowledgement to the patron card. In 356, the patron card may then return to step 352 above and repeat until all transactions are acknowledged.

Figure 8:
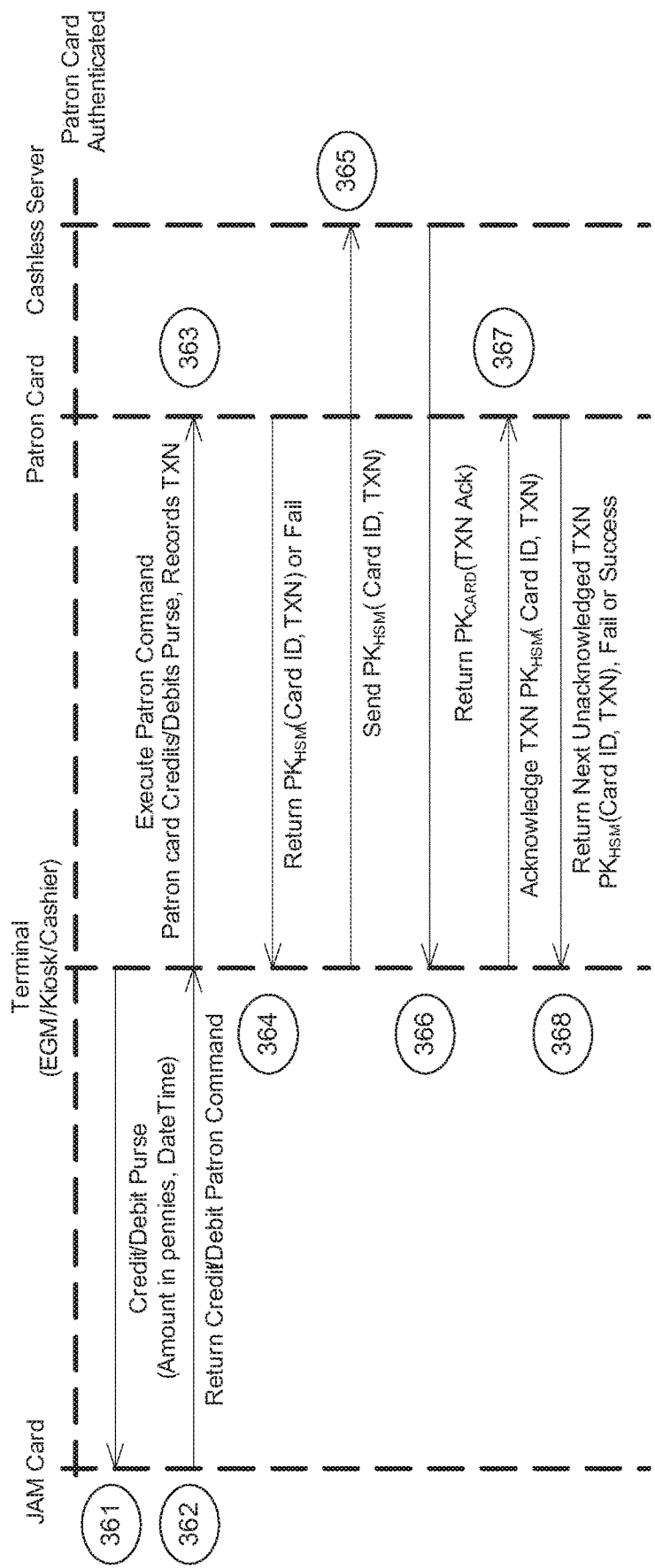
FIG. 8 illustrates a sequence related to debit/credit transactions.

Credit and debit processing is described with respect to FIG. 8 for one embodiment of the present invention. The present invention is not limited to just these two types of transaction which are provided for illustrative purposes only. In one embodiment, in order for a terminal application to credit or debit a patron card the prior authentication process is completed. All patron card commands may begin by communicating the intent to the JAM, as shown in FIG. 8.

In 361, the terminal may request the JAM card to credit the purse on the patron card. In 362, the JAM may return the entire APDU command to be executed against the patron card (an APDU command is typically compatible with Java Card™ specifications). In 363, the terminal may execute the APDU command and the patron card may process the command, credit the purse and record a transaction. In 364, the patron card may then return the transaction, encrypted with the HSM's public key ready for sending to the cashless server. Or it fails to credit the purse. The card's state may now changes to offline. Offline limits may apply until the card has been acknowledged.

In 365, the terminal may send the results of step 364 to the cashless server. In the 366, the cashless server may send the acknowledgement back to the terminal. In 367, the terminal may send information to the patron card related to the transaction acknowledgement returned by the cashless server. In 368, the patron card may process the acknowledgement and returns a failure code if unsuccessful. If there are remaining unacknowledged transactions it returns the next one, if not then it returns success with no data. The card state may change to online when all transactions have been acknowledged.

Figure 9:
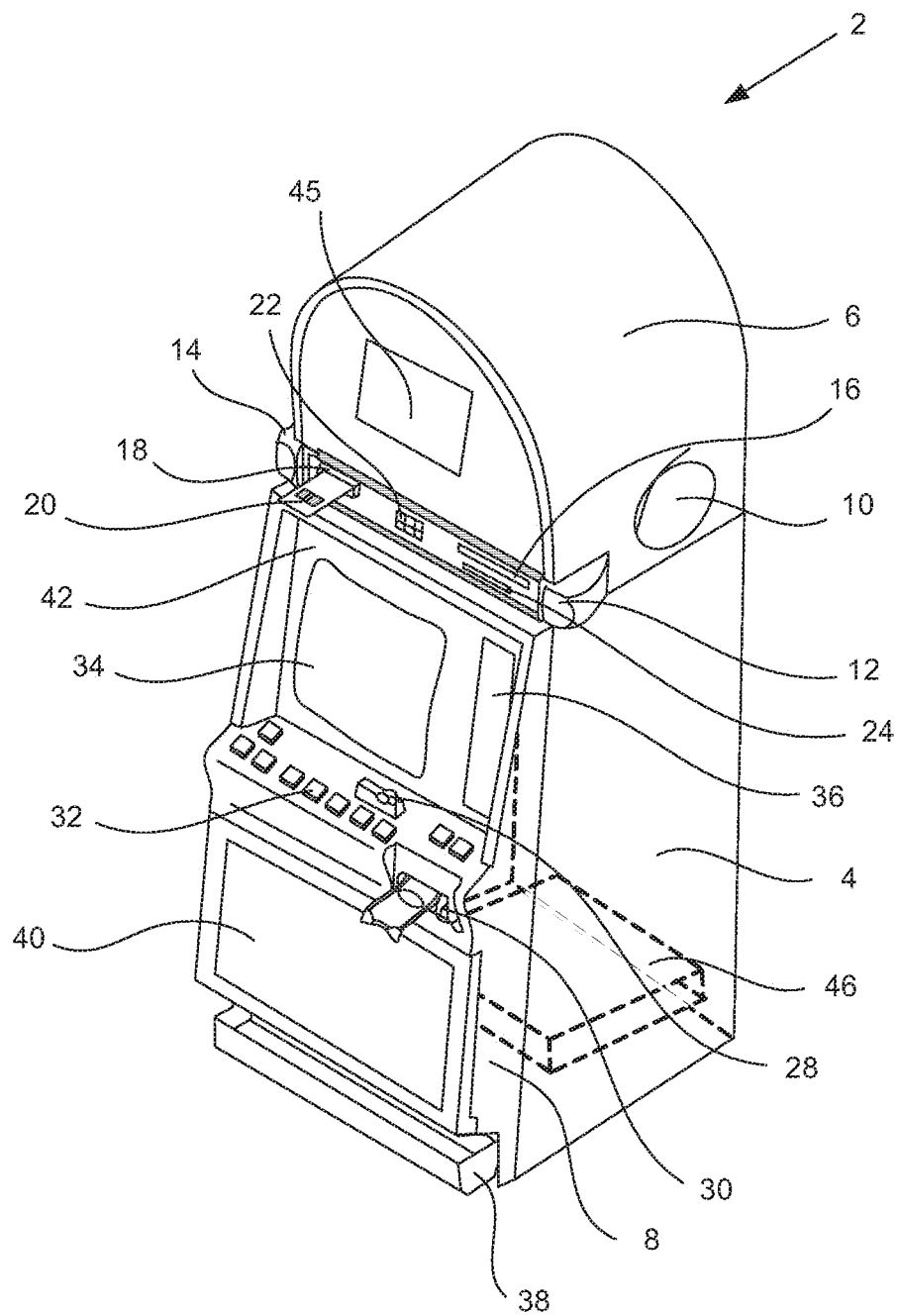
FIG. 9 illustrates a gaming machine.

Next some examples of gaming devices, gaming systems, network devices and cashless system architectures that may be utilized with the methods and architecture described with respect to FIGS. 1-8 are described. As illustrated in the example of FIG. 9, machine 2 includes a main cabinet 4, which generally surrounds the machine interior and is viewable by users. The main cabinet includes a main door 8 on the front of the machine, which opens to provide access to the interior of the machine. Attached to the main door are player-input switches or buttons 32, a coin acceptor 28, and a bill validator 30, a coin tray 38, and a belly glass 40. Viewable through the main door is a video display monitor 34 and an information panel 36. The display monitor 34 will typically be a cathode ray tube, high resolution flat-panel LCD, or other conventional electronically controlled video monitor. The information panel 36 may be a back-lit, silk screened glass panel with lettering to indicate general game information including, for example, a game denomination (e.g. $0.25 or $1). The bill validator 30, player-input switches 32, video display monitor 34, and information panel are devices used to play a game on the game machine 2.

According to a specific embodiment, the devices may be controlled by code executed by a master gaming controller 46 housed inside the main cabinet 4 of the machine 2. The hardware and software associated with the master gaming controller 46 may be distributed throughout the cabinet 4 and is not limited to the specific location illustrated in the FIG. 9. In specific embodiments where it may be required that the code be periodically configured and/or authenticated in a secure manner, the technique of the present invention may be used for accomplishing such tasks.

Many different types of games, including mechanical slot games, video slot games, video poker, video black jack, video pachinko and lottery, may be provided with gaming machines of this invention. In particular, the gaming machine 2 may be operable to provide a play of many different instances of games of chance. The instances may be differentiated according to themes, sounds, graphics, type of game (e.g., slot game vs. card game), denomination, number of paylines, maximum jackpot, progressive or non-progressive, bonus games, etc. The gaming machine 2 may be operable to allow a player to select a game of chance to play from a plurality of instances available on the gaming machine. For example, the gaming machine may provide a menu with a list of the instances of games that are available for play on the gaming machine and a player may be able to select from the list a first instance of a game of chance that they wish to play.

The various instances of games available for play on the gaming machine 2 may be stored as game software on a mass storage device in the gaming machine or may be generated on a remote gaming device but then displayed on the gaming machine. The gaming machine 2 may executed game software, such as but not limited to video streaming software that allows the game to be displayed on the gaming machine. When an instance is stored on the gaming machine 2, it may be loaded from the mass storage device into a RAM for execution. In some cases, after a selection of an instance, the game software that allows the selected instance to be generated may be downloaded from a remote gaming device, such as another gaming machine.

As illustrated in the example of FIG. 9, the gaming machine 2 may include a top box 6, which sits on top of the main cabinet 4. The top box 6 may house a number of devices, which may be used to add features to a game being played on the gaming machine 2, including speakers 10, 12, 14, a ticket printer 18 which prints bar-coded tickets 20, a key pad 22 for entering player tracking information, a florescent display 16 for displaying player tracking information, a card reader 24 for entering a magnetic striped card containing player tracking information, and a video display screen 45. The ticket printer 18 may be used to print tickets for a cashless ticketing system. Further, the top box 6 may house different or additional devices not illustrated in FIG. 9. For example, the top box may include a bonus wheel or a back-lit silk screened panel, which may be used to add bonus features to the game being played on the gaming machine or a wireless interface for communication with a patron card. As another example, the top box may include a display for a progressive jackpot offered on the gaming machine. During a game, these devices may be controlled and may be powered, in part, by circuitry (e.g. a master gaming controller) housed within the main cabinet 4 of the machine 2.

It will be appreciated that gaming machine 2 is but one example from a wide range of gaming machine designs on which the present invention may be implemented. For example, not all suitable gaming machines have top boxes or player tracking features. Further, some gaming machines have only a single game display—mechanical or video, while others are designed for bar tables and have displays that face upwards. As another example, a game may be generated in on a host computer and may be displayed on a remote terminal or a remote gaming device. The remote gaming device may be connected to the host computer via a network of some type such as a local area network, a wide area network, an intranet or the Internet. The remote gaming device may be a portable gaming device such as but not limited to a cell phone, a personal digital assistant, and a wireless game player. Thus, those of skill in the art will understand that the present invention, as described below, can be deployed on most any gaming machine now available or hereafter developed.

Some preferred gaming machines of the present assignee are implemented with special features and/or additional circuitry that differentiates them from general-purpose computers (e.g., desktop PC's and laptops). Gaming machines are highly regulated to ensure fairness and, in many cases, gaming machines are operable to dispense monetary awards of multiple millions of dollars. Therefore, to satisfy security and regulatory requirements in a gaming environment, hardware and software architectures may be implemented in gaming machines that differ significantly from those of general-purpose computers. A description of gaming machines relative to general-purpose computing machines and some examples of the additional (or different) components and features found in gaming machines are described below.

At first glance, one might think that adapting PC technologies to the gaming industry would be a simple proposition because both PCs and gaming machines employ microprocessors that control a variety of devices. However, because of such reasons as 1) the regulatory requirements that are placed upon gaming machines, 2) the harsh environment in which gaming machines operate, 3) security requirements and 4) fault tolerance requirements, adapting PC technologies to a gaming machine can be quite difficult. Further, techniques and methods for solving a problem in the PC industry, such as device compatibility and connectivity issues, might not be adequate in the gaming environment. For instance, a fault or a weakness tolerated in a PC, such as security holes in software or frequent crashes, may not be tolerated in a gaming machine because in a gaming machine these faults can lead to a direct loss of funds from the gaming machine, such as stolen cash or loss of revenue when the gaming machine is not operating properly.

For the purposes of illustration, a few differences between PC systems and gaming systems will be described. A first difference between gaming machines and common PC based computers systems is that gaming machines are designed to be state-based systems. In a state-based system, the system stores and maintains its current state in a non-volatile memory, such that, in the event of a power failure or other malfunction the gaming machine will return to its current state when the power is restored. For instance, if a player was shown an award for a game of chance and, before the award could be provided to the player the power failed, the gaming machine, upon the restoration of power, would return to the state where the award is indicated. As anyone who has used a PC, knows, PCs are not state machines and a majority of data is usually lost when a malfunction occurs. This requirement affects the software and hardware design on a gaming machine.

A second important difference between gaming machines and common PC based computer systems is that for regulation purposes, the software on the gaming machine used to generate the game of chance and operate the gaming machine has been designed to be static and monolithic to prevent cheating by the operator of gaming machine. For instance, one solution that has been employed in the gaming industry to prevent cheating and satisfy regulatory requirements has been to manufacture a gaming machine that can use a proprietary processor running instructions to generate the game of chance from an EPROM or other form of non-volatile memory. The coding instructions on the EPROM are static (non-changeable) and must be approved by a gaming regulators in a particular jurisdiction and installed in the presence of a person representing the gaming jurisdiction. Any changes to any part of the software required to generate the game of chance, such as adding a new device driver used by the master gaming controller to operate a device during generation of the game of chance can require a new EPROM to be burnt, approved by the gaming jurisdiction and reinstalled on the gaming machine in the presence of a gaming regulator. Regardless of whether the EPROM solution is used, to gain approval in most gaming jurisdictions, a gaming machine must demonstrate sufficient safeguards that prevent an operator or player of a gaming machine from manipulating hardware and software in a manner that gives them an unfair and some cases an illegal advantage. The gaming machine should have a means to determine if the code it will execute is valid. If the code is not valid, the gaming machine must have a means to prevent the code from being executed. The code validation requirements in the gaming industry affect both hardware and software designs on gaming machines.

A third important difference between gaming machines and common PC based computer systems is the number and kinds of peripheral devices used on a gaming machine are not as great as on PC based computer systems. Traditionally, in the gaming industry, gaming machines have been relatively simple in the sense that the number of peripheral devices and the number of functions the gaming machine has been limited. Further, in operation, the functionality of gaming machines were relatively constant once the gaming machine was deployed, i.e., new peripherals devices and new gaming software were infrequently added to the gaming machine. This differs from a PC where users will go out and buy different combinations of devices and software from different manufacturers and connect them to a PC to suit their needs depending on a desired application. Therefore, the types of devices connected to a PC may vary greatly from user to user depending in their individual requirements and may vary significantly over time.

Although the variety of devices available for a PC may be greater than on a gaming machine, gaming machines still have unique device requirements that differ from a PC, such as device security requirements not usually addressed by PCs. For instance, monetary devices, such as coin dispensers, bill validators and ticket printers and computing devices that are used to govern the input and output of cash to a gaming machine have security requirements that are not typically addressed in PCs. Therefore, many PC techniques and methods developed to facilitate device connectivity and device compatibility do not address the emphasis placed on security in the gaming industry.

To address some of the issues described above, a number of hardware/software components and architectures are utilized in gaming machines that are not typically found in general purpose computing devices, such as PCs. These hardware/software components and architectures, as described below in more detail, include but are not limited to watchdog timers, voltage monitoring systems, state-based software architecture and supporting hardware, specialized communication interfaces, security monitoring and trusted memory.

For example, a watchdog timer is normally used in International Game Technology (IGT) gaming machines to provide a software failure detection mechanism. In a normally operating system, the operating software periodically accesses control registers in the watchdog timer subsystem to "re-trigger" the watchdog. Should the operating software fail to access the control registers within a preset timeframe, the watchdog timer will timeout and generate a system reset. Typical watchdog timer circuits include a loadable timeout counter register to allow the operating software to set the timeout interval within a certain range of time. A differentiating feature of the some preferred circuits is that the operating software cannot completely disable the function of the watchdog timer. In other words, the watchdog timer always functions from the time power is applied to the board.

IGT gaming computer platforms preferably use several power supply voltages to operate portions of the computer circuitry. These can be generated in a central power supply or locally on the computer board. If any of these voltages falls out of the tolerance limits of the circuitry they power, unpredictable operation of the computer may result. Though most modern general-purpose computers include voltage monitoring circuitry, these types of circuits only report voltage status to the operating software. Out of tolerance voltages can cause software malfunction, creating a potential uncontrolled condition in the gaming computer. Gaming machines of the present assignee typically have power supplies with tighter voltage margins than that required by the operating circuitry. In addition, the voltage monitoring circuitry implemented in IGT gaming computers typically has two thresholds of control. The first threshold generates a software event that can be detected by the operating software and an error condition generated. This threshold is triggered when a power supply voltage falls out of the tolerance range of the power supply, but is still within the operating range of the circuitry. The second threshold is set when a power supply voltage falls out of the operating tolerance of the circuitry. In this case, the circuitry generates a reset, halting operation of the computer.

The standard method of operation for IGT gaming machine game software is to use a state machine. Different functions of the game (bet, play, result, points in the graphical presentation, etc.) may be defined as a state. When a game moves from one state to another, critical data regarding the game software is stored in a custom non-volatile memory subsystem. This is critical to ensure the player's wager and credits are preserved and to minimize potential disputes in the event of a malfunction on the gaming machine.

In general, the gaming machine does not advance from a first state to a second state until critical information that allows the first state to be reconstructed is stored. This feature allows the game to recover operation to the current state of play in the event of a malfunction, loss of power, etc that occurred just prior to the malfunction. After the state of the gaming machine is restored during the play of a game of chance, game play may resume and the game may be completed in a manner that is no different than if the malfunction had not occurred. Typically, battery backed RAM devices are used to preserve this critical data although other types of non-volatile memory devices may be employed. These memory devices are not used in typical general-purpose computers.

As described in the preceding paragraph, when a malfunction occurs during a game of chance, the gaming machine may be restored to a state in the game of chance just prior to when the malfunction occurred. The restored state may include metering information and graphical information that was displayed on the gaming machine in the state prior to the malfunction. For example, when the malfunction occurs during the play of a card game after the cards have been dealt, the gaming machine may be restored with the cards that were previously displayed as part of the card game. As another example, a bonus game may be triggered during the play of a game of chance where a player is required to make a number of selections on a video display screen. When a malfunction has occurred after the player has made one or more selections, the gaming machine may be restored to a state that shows the graphical presentation at the just prior to the malfunction including an indication of selections that have already been made by the player. In general, the gaming machine may be restored to any state in a plurality of states that occur in the game of chance that occurs while the game of chance is played or to states that occur between the play of a game of chance.

Game history information regarding previous games played such as an amount wagered, the outcome of the game and so forth may also be stored in a non-volatile memory device. The information stored in the non-volatile memory may be detailed enough to reconstruct a portion of the graphical presentation that was previously presented on the gaming machine and the state of the gaming machine (e.g., balance) at the time the game of chance was played. The game history information may be utilized in the event of a dispute. For example, a player may decide that in a previous game of chance that they did not receive credit for an award that they believed they won. The game history information may be used to reconstruct the state of the gaming machine prior, during and/or after the disputed game to demonstrate whether the player was correct or not in their assertion. Further details of a state based gaming system, recovery from malfunctions and game history are described in U.S. Pat. No. 6,804,763, titled "High Performance Battery Backed RAM Interface", U.S. Pat. No. 6,863,608, titled "Frame Capture of Actual Game Play," U.S. application Ser. No. 10/243,104, titled, "Dynamic NV-RAM," and U.S. application Ser. No. 10/758,828, titled, "Frame Capture of Actual Game Play," each of which is incorporated by reference and for all purposes.

Another feature of gaming machines, such as IGT gaming computers, is that they often include unique interfaces, including serial interfaces, to connect to specific subsystems internal and external to the gaming machine. The serial devices may have electrical interface requirements that differ from the "standard" EIA 232 serial interfaces provided by general-purpose computers. These interfaces may include EIA 485, EIA 422, Fiber Optic Serial, optically coupled serial interfaces, current loop style serial interfaces, etc. In addition, to conserve serial interfaces internally in the gaming machine, serial devices may be connected in a shared, daisy-chain fashion where multiple peripheral devices are connected to a single serial channel.

The serial interfaces may be used to transmit information using communication protocols that are unique to the gaming industry. For example, IGT's Netplex is a proprietary communication protocol used for serial communication between gaming devices. As another example, SAS is a communication protocol used to transmit information, such as metering information, from a gaming machine to a remote device. Often SAS is used in conjunction with a player tracking system.

IGT gaming machines may alternatively be treated as peripheral devices to a casino communication controller and connected in a shared daisy chain fashion to a single serial interface. In both cases, the peripheral devices are preferably assigned device addresses. If so, the serial controller circuitry must implement a method to generate or detect unique device addresses. General-purpose computer serial ports are not able to do this.

Security monitoring circuits detect intrusion into an IGT gaming machine by monitoring security switches attached to access doors in the gaming machine cabinet. Preferably, access violations result in suspension of game play and can trigger additional security operations to preserve the current state of game play. These circuits also function when power is off by use of a battery backup. In power-off operation, these circuits continue to monitor the access doors of the gaming machine. When power is restored, the gaming machine can determine whether any security violations occurred while power was off, e.g., via software for reading status registers. This can trigger event log entries and further data authentication operations by the gaming machine software.

Trusted memory devices and/or trusted memory sources are preferably included in an IGT gaming machine computer to ensure the authenticity of the software that may be stored on less secure memory subsystems, such as mass storage devices. As previously noted a JAM card in a gaming machine may treat information received from the master gaming controller as not trusted as it may be unaware that the gaming machine includes a trusted memory device. Trusted memory devices and controlling circuitry are typically designed to not allow modification of the code and data stored in the memory device while the memory device is installed in the gaming machine. The code and data stored in these devices may include authentication algorithms, random number generators, authentication keys, operating system kernels, etc. The purpose of these trusted memory devices is to provide gaming regulatory authorities a root trusted authority within the computing environment of the gaming machine that can be tracked and verified as original. This may be accomplished via removal of the trusted memory device from the gaming machine computer and verification of the secure memory device contents is a separate third party verification device. Once the trusted memory device is verified as authentic, and based on the approval of the verification algorithms included in the trusted device, the gaming machine is allowed to verify the authenticity of additional code and data that may be located in the gaming computer assembly, such as code and data stored on hard disk drives. A few details related to trusted memory devices that may be used in the present invention are described in U.S. Pat. No. 6,685,567 from U.S. patent application Ser. No. 09/925,098, filed Aug. 8, 2001 and titled "Process Verification," which is incorporated herein in its entirety and for all purposes.

In at least one embodiment, at least a portion of the trusted memory devices/sources may correspond to memory which cannot easily be altered (e.g., "unalterable memory") such as, for example, EPROMS, PROMS, Bios, Extended Bios, and/or other memory sources which are able to be configured, verified, and/or authenticated (e.g., for authenticity) in a secure and controlled manner.

According to a specific implementation, when a trusted information source is in communication with a remote device via a network, the remote device may employ a verification scheme to verify the identity of the trusted information source. For example, the trusted information source and the remote device may exchange information using public and private encryption keys to verify each other's identities. In another embodiment of the present invention, the remote device and the trusted information source may engage in methods using zero knowledge proofs to authenticate each of their respective identities.

Gaming devices storing trusted information might utilize apparatus or methods to detect and prevent tampering. For instance, trusted information stored in a trusted memory device may be encrypted to prevent its misuse. In addition, the trusted memory device may be secured behind a locked door. Further, one or more sensors may be coupled to the memory device to detect tampering with the memory device and provide some record of the tampering. In yet another example, the memory device storing trusted information might be designed to detect tampering attempts and clear or erase itself when an attempt at tampering has been detected.

Additional details relating to trusted memory devices/ sources are described in U.S. patent application Ser. No. 11/078,966, entitled "Secured Virtual Network in a Gaming Environment", naming Nguyen et al. as inventors, filed on Mar. 10, 2005, herein incorporated in its entirety and for all purposes. This application also describes authentication and device verification methods that may be applied to the JAM card and Patron Cards described with respect to FIGS. 1-8.

Mass storage devices used in a general purpose computer typically allow code and data to be read from and written to the mass storage device. In a gaming machine environment, modification of the gaming code stored on a mass storage device is strictly controlled and would only be allowed under specific maintenance type events with electronic and physical enablers required. Though this level of security could be provided by software, IGT gaming computers that include mass storage devices preferably include hardware level mass storage data protection circuitry that operates at the circuit level to monitor attempts to modify data on the mass storage device and will generate both software and hardware error triggers should a data modification be attempted without the proper electronic and physical enablers being present. Details using a mass storage device that may be used with the present invention are described, for example, in U.S. Pat. No. 6,149,522, herein incorporated by reference in its entirety for all purposes.

Returning to the example of FIG. 9, when a user wishes to play the gaming machine 2, he or she inserts cash through the coin acceptor 28 or bill validator 30. Additionally, the bill validator may accept a printed ticket voucher, which may be accepted by the bill validator 30 as indicia of credit when a cashless ticketing system is used. In addition, the gaming machine may include an interface that allows a patron card or other portable device described with respect to FIGS. 1-8 to communicate with the gaming machine including a transfer of credits between the portable gaming device and the gaming machine.

At the start of the game, the player may enter playing tracking information using the card reader 24, the keypad 22, and the florescent display 16. Further, other game preferences of the player playing the game may be read from a card inserted into the card reader. In one embodiment, the card reader on the gaming machine may be configured to accept the patron cards described with respect to FIGS. 1-8. Further, the player tracking unit may include a JAM card that allows credits to be transferred to and from the gaming machine and to and from the patron card via the player tracking unit. In particular, the player tracking unit may be operable to communicate with a cashless server.

During the game, the player may view game information using the video display 34. Other game and prize information may also be displayed in the video display screen 45 located in the top box. During the course of a game, a player may be required to make a number of decisions, which affect the outcome of the game. For example, a player may vary his or her wager on a particular game, select a prize for a particular game selected from a prize server, or make game decisions which affect the outcome of a particular game. The player may make these choices using the player-input switches 32, the video display screen 34 or using some other device which enables a player to input information into the gaming machine. In some embodiments, the player may be able to access various game services such as concierge services and entertainment content services using the video display screen 34 and one or more input devices.

During certain game events, the gaming machine 2 may display visual and auditory effects that can be perceived by the player. These effects add to the excitement of a game, which makes a player more likely to continue playing. Auditory effects include various sounds that are projected by the speakers 10, 12, 14. Visual effects include flashing lights, strobing lights or other patterns displayed from lights on the gaming machine 2 or from lights behind the belly glass 40. After the player has completed a game, the player may receive game tokens from the coin tray 38 or the ticket 20 from the printer 18, which may be used for further games or to redeem a prize. Further, the player may receive a ticket 20 for food, merchandise, or games from the printer 18 or information that allows food or merchandise may be transferred to a patron card in transactions similar to those that were described with respect to FIGS. 1-8.

Figure 10:
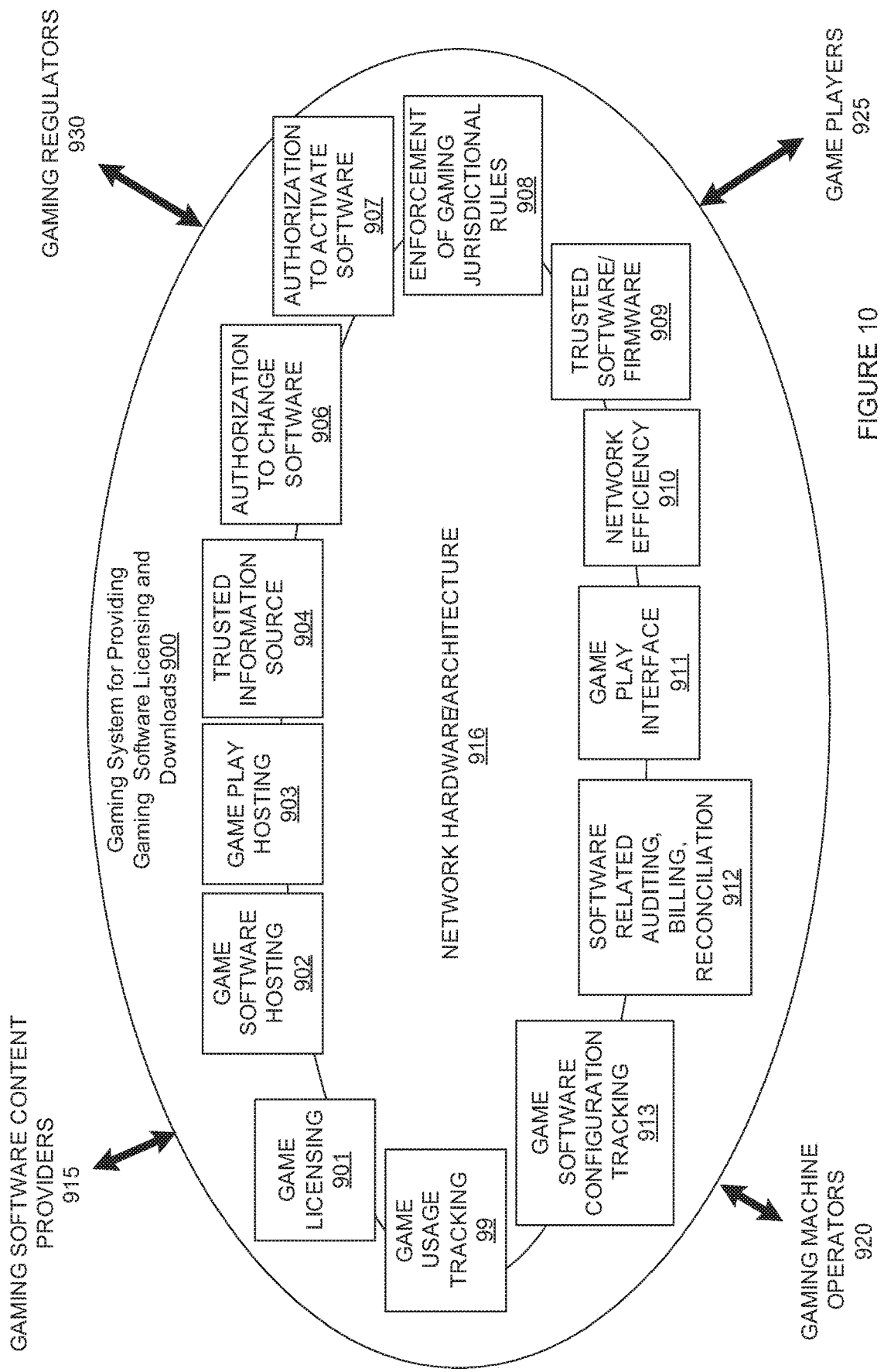
FIG. 10 illustrates a gaming system and associated components.

FIG. 10 shows a block diagram illustrating components of a gaming system 900 which may be used for implementing various aspects of the present invention. In FIG. 10, the components of a gaming system 900 for providing game software licensing and software downloads are described functionally. The described functions may be instantiated in hardware, firmware and/or software and executed on a suitable device. These downloads may include downloads of applets for JAM cards or patron cards and software for allowing terminals to interact with JAM cards or patron cards. In the system 900, there may be many instances of the same function, such as multiple game play interfaces 911.

Nevertheless, in FIG. 10, only one instance of each function is shown. The functions of the components may be combined. For example, a single device may comprise the game play interface 911 and include trusted memory devices or sources 909. The described components and their functions may be incorporated various embodiments of the servers and devices described with respect to FIGS. 1-10.

The gaming system 900 may receive inputs from different groups/entities and output various services and or information to these groups/entities. For example, game players 925 primarily input cash or indicia of credit into the system, make game selections that trigger software downloads, and receive entertainment in exchange for their inputs. Game software content providers provide game software for the system and may receive compensation for the content they provide based on licensing agreements with the gaming machine operators. Gaming machine operators select game software for distribution, distribute the game software on the gaming devices in the system 900, receive revenue for the use of their software and compensate the gaming machine operators. The gaming regulators 930 may provide rules and regulations that must be applied to the gaming system and may receive reports and other information confirming that rules are being obeyed.

In the following paragraphs, details of each component and some of the interactions between the components are described with respect to FIG. 10. The game software license host 901 may be a server connected to a number of remote gaming devices that provides licensing services to the remote gaming devices. For example, in other embodiments, the license host 901 may 1) receive token requests for tokens used to activate software executed on the remote gaming devices, 2) send tokens to the remote gaming devices, 3) track token usage and 4) grant and/or renew software licenses for software executed on the remote gaming devices. The token usage may be used in utility based licensing schemes, such as a pay-per-use scheme.

In another embodiment, a game usage-tracking host 915 may track the usage of game software on a plurality of devices in communication with the host. The game usage-tracking host 915 may be in communication with a plurality of game play hosts and gaming machines. From the game play hosts and gaming machines, the game usage tracking host 915 may receive updates of an amount that each game available for play on the devices has been played and on amount that has been wagered per game. This information may be stored in a database and used for billing according to methods described in a utility based licensing agreement.

The game software host 902 may provide game software downloads, such as downloads of game software or game firmware, to various devious in the game system 900. For example, when the software to generate the game is not available on the game play interface 911, the game software host 902 may download software to generate a selected game of chance played on the game play interface. Further, the game software host 902 may download new game content to a plurality of gaming machines via a request from a gaming machine operator.

In one embodiment, the game software host 902 may also be a game software configuration-tracking host 913. The function of the game software configuration-tracking host is to keep records of software configurations and/or hardware configurations for a plurality of devices in communication with the host (e.g., denominations, number of paylines, paytables, max/min bets). Details of a game software host and a game software configuration host that may be used with the present invention are described in co-pending U.S.

Pat. No. 6,645,077, by Rowe, entitled, "Gaming Terminal Data Repository and Information System," filed Dec. 21, 2000, which is incorporated herein in its entirety and for all purposes.

A game play host device 903 may be a host server connected to a plurality of remote clients that generates games of chance that are displayed on a plurality of remote game play interfaces 911. For example, the game play host device 903 may be a server that provides central determination for a bingo game play played on a plurality of connected game play interfaces 911. As another example, the game play host device 903 may generate games of chance, such as slot games or video card games, for display on a remote client. A game player using the remote client may be able to select from a number of games that are provided on the client by the host device 903. The game play host device 903 may receive game software management services, such as receiving downloads of new game software, from the game software host 902 and may receive game software licensing services, such as the granting or renewing of software licenses for software executed on the device 903, from the game license host 901.

In particular embodiments, the game play interfaces or other gaming devices in the gaming system 900 may be portable devices, such as electronic tokens, cell phones, smart cards, tablet PC's and PDA's. The portable devices may support wireless communications and thus, may be referred to as wireless mobile devices. The network hardware architecture 916 may be enabled to support communications between wireless mobile devices and other gaming devices in gaming system. In one embodiment, the wireless mobile devices may be used to play games of chance.

The gaming system 900 may use a number of trusted information sources, such as the HSM previously described. Trusted information sources 904 may be devices, such as servers, that provide information used to authenticate/activate other pieces of information. CRC values used to authenticate software, license tokens used to allow the use of software or product activation codes used to activate to software are examples of trusted information that might be provided from a trusted information source 904. Trusted information sources may be a memory device, such as an EPROM, that includes trusted information used to authenticate other information. For example, a game play interface 911 may store a private encryption key in a trusted memory device that is used in a private key-public key encryption scheme to authenticate information from another gaming device.

When a trusted information source 904 is in communication with a remote device via a network, the remote device will employ a verification scheme to verify the identity of the trusted information source. For example, the trusted information source and the remote device may exchange information using public and private encryption keys to verify each other's identities.

Gaming devices storing trusted information might utilize apparatus or methods to detect and prevent tampering. For instance, trusted information stored in a trusted memory device may be encrypted to prevent its misuse. In addition, the trusted memory device may be secured behind a locked door. Further, one or more sensors may be coupled to the memory device to detect tampering with the memory device and provide some record of the tampering. In yet another example, the memory device storing trusted information might be designed to detect tampering attempts and clear or erase itself when an attempt at tampering has been detected.

The gaming system 900 of the present invention may include devices 906 that provide authorization to download software from a first device to a second device and devices 907 that provide activation codes or information that allow downloaded software to be activated. The devices, 906 and 907, may be remote servers and may also be trusted information sources. One example of a method of providing product activation codes that may be used with the present invention is describes in previously incorporated U.S. Pat. No. 6,264,561.

A device 906 that monitors a plurality of gaming devices to determine adherence of the devices to gaming jurisdictional rules 908 may be included in the system 900. In one embodiment, a gaming jurisdictional rule server may scan software and the configurations of the software on a number of gaming devices in communication with the gaming rule server to determine whether the software on the gaming devices is valid for use in the gaming jurisdiction where the gaming device is located. For example, the gaming rule server may request a digital signature, such as CRC's, of particular software components and compare them with an approved digital signature value stored on the gaming jurisdictional rule server.

Further, the gaming jurisdictional rule server may scan the remote gaming device to determine whether the software is configured in a manner that is acceptable to the gaming jurisdiction where the gaming device is located. For example, a maximum bet limit may vary from jurisdiction to jurisdiction and the rule enforcement server may scan a gaming device to determine its current software configuration and its location and then compare the configuration on the gaming device with approved parameters for its location.

A gaming jurisdiction may include rules that describe how game software may be downloaded and licensed. The gaming jurisdictional rule server may scan download transaction records and licensing records on a gaming device to determine whether the download and licensing was carried out in a manner that is acceptable to the gaming jurisdiction in which the gaming device is located. In general, the game jurisdictional rule server may be utilized to confirm compliance to any gaming rules passed by a gaming jurisdiction when the information needed to determine rule compliance is remotely accessible to the server.

Game software, firmware or hardware residing a particular gaming device may also be used to check for compliance with local gaming jurisdictional rules. In one embodiment, when a gaming device is installed in a particular gaming jurisdiction, a software program including jurisdiction rule information may be downloaded to a secure memory location on a gaming machine or the jurisdiction rule information may be downloaded as data and utilized by a program on the gaming machine. The software program and/or jurisdiction rule information may used to check the gaming device software and software configurations for compliance with local gaming jurisdictional rules. In another embodiment, the software program for ensuring compliance and jurisdictional information may be installed in the gaming machine prior to its shipping, such as at the factory where the gaming machine is manufactured.

The gaming devices in game system 900 may utilize trusted software and/or trusted firmware. Trusted firmware/software is trusted in the sense that is used with the assumption that it has not been tampered with. For instance, trusted software/firmware may be used to authenticate other game software or processes executing on a gaming device. As an example, trusted encryption programs and authentication programs may be stored on an EPROM on the gaming machine or encoded into a specialized encryption chip. As another example, trusted game software, i.e., game software approved for use on gaming devices by a local gaming jurisdiction may be required on gaming devices on the gaming machine.

In the present invention, the devices may be connected by a network 916 with different types of hardware using different hardware architectures. Game software can be quite large and frequent downloads can place a significant burden on a network, which may slow information transfer speeds on the network. For game-on-demand services that require frequent downloads of game software in a network, efficient downloading is essential for the service to viable. Thus, in the present inventions, network efficient devices 910 may be used to actively monitor and maintain network efficiency. For instance, software locators may be used to locate nearby locations of game software for peer-to-peer transfers of game software. In another example, network traffic may be monitored and downloads may be actively rerouted to maintain network efficiency.

One or more devices in the present invention may provide game software and game licensing related auditing, billing and reconciliation reports to server 912. For example, a software licensing billing server may generate a bill for a gaming device operator based upon a usage of games over a time period on the gaming devices owned by the operator. In another example, a software auditing server may provide reports on game software downloads to various gaming devices in the gaming system 900 and current configurations of the game software on these gaming devices.

At particular time intervals, the software auditing server 912 may also request software configurations from a number of gaming devices in the gaming system. The server may then reconcile the software configuration on each gaming device. In one embodiment, the software auditing server 912 may store a record of software configurations on each gaming device at particular times and a record of software download transactions that have occurred on the device. By applying each of the recorded game software download transactions since a selected time to the software configuration recorded at the selected time, a software configuration is obtained. The software auditing server may compare the software configuration derived from applying these transactions on a gaming device with a current software configuration obtained from the gaming device. After the comparison, the software-auditing server may generate a reconciliation report that confirms that the download transaction records are consistent with the current software configuration on the device. The report may also identify any inconsistencies. In another embodiment, both the gaming device and the software auditing server may store a record of the download transactions that have occurred on the gaming device and the software auditing server may reconcile these records.

There are many possible interactions between the components described with respect to FIG. 6*a*. Many of the interactions are coupled. For example, methods used for game licensing may affect methods used for game downloading and vice versa. For the purposes of explanation, details of a few possible interactions between the components of the system 900 relating to software licensing and software downloads have been described. The descriptions are selected to illustrate particular interactions in the game system 900. These descriptions are provided for the purposes of explanation only and are not intended to limit the scope of the present invention.

Figure 11:
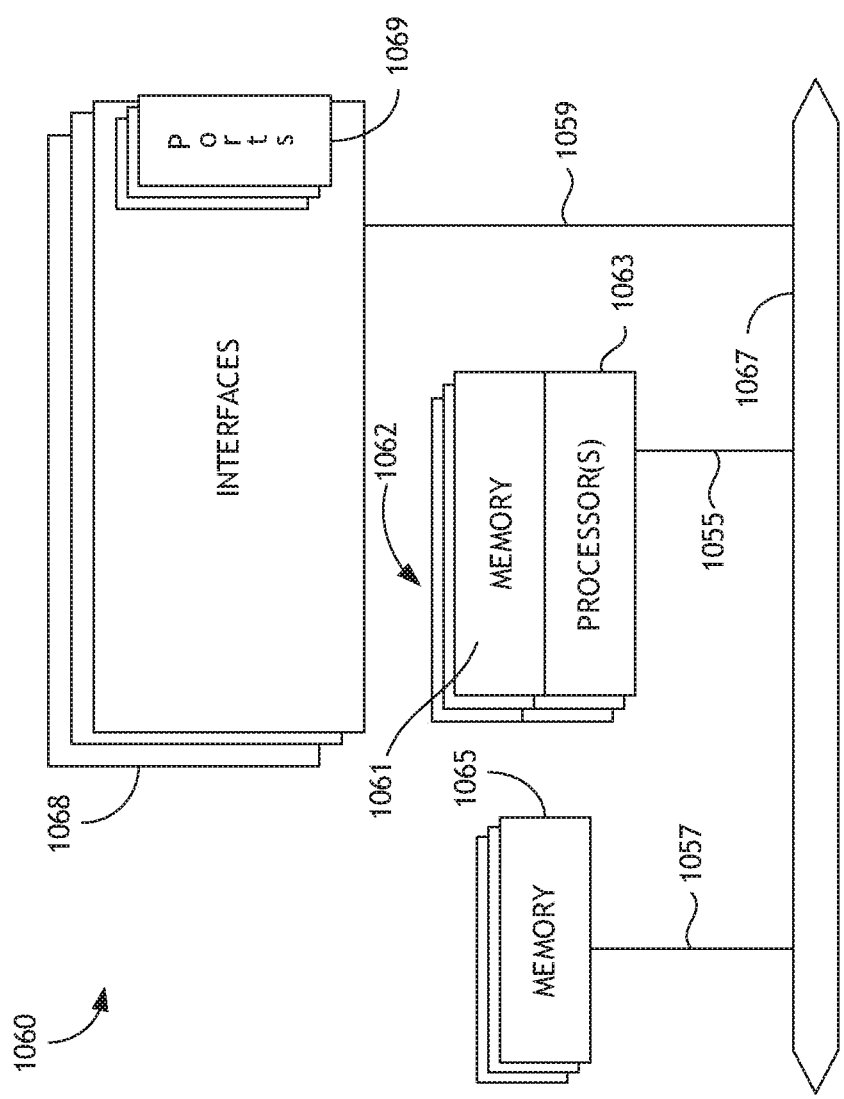
FIG. 11 illustrates components of a server.

FIG. 11 illustrates an example of a network device that may be configured for implementing some methods of the present invention, such as methods described with respect to a cashless server and/or a key management server. Network device 1060 includes a master central processing unit (CPU) 1062, interfaces 1068, and a bus 1067 (e.g., a PCI bus). Generally, interfaces 1068 include ports 1069 appropriate for communication with the appropriate media. In some embodiments, one or more of interfaces 1068 includes at least one independent processor and, in some instances, volatile RAM. The independent processors may be, for example, ASICs or any other appropriate processors. According to some such embodiments, these independent processors perform at least some of the functions of the logic described herein. In some embodiments, one or more of interfaces 1068 control such communications-intensive tasks as encryption, decryption, compression, decompression, packetization, media control and management. By providing separate processors for the communications-intensive tasks, interfaces 1068 allow the master microprocessor 1062 efficiently to perform other functions such as routing computations, network diagnostics, security functions, etc.

The interfaces 1068 are typically provided as interface cards (sometimes referred to as "linecards"). Generally, interfaces 1068 control the sending and receiving of data packets over the network and sometimes support other peripherals used with the network device 1060. Among the interfaces that may be provided are FC interfaces, Ethernet interfaces, frame relay interfaces, cable interfaces, DSL interfaces, token ring interfaces, and the like. In addition, various very high-speed interfaces may be provided, such as fast Ethernet interfaces, Gigabit Ethernet interfaces, ATM interfaces, HSSI interfaces, POS interfaces, FDDI interfaces, ASI interfaces, DHEI interfaces and the like.

When acting under the control of appropriate software or firmware, in some implementations of the invention CPU 1062 may be responsible for implementing specific functions associated with the functions of a desired network device. According to some embodiments, CPU 1062 accomplishes all these functions under the control of software including an operating system and any appropriate applications software.

CPU 1062 may include one or more processors 1063 such as a processor from the Motorola family of microprocessors or the MIPS family of microprocessors. In an alternative embodiment, processor 1063 is specially designed hardware for controlling the operations of network device 1060. In a specific embodiment, a memory 1061 (such as non-volatile RAM and/or ROM) also forms part of CPU 1062. However, there are many different ways in which memory could be coupled to the system. Memory block 1061 may be used for a variety of purposes such as, for example, caching and/or storing data, programming instructions, etc.

Regardless of network device's configuration, it may employ one or more memories or memory modules (such as, for example, memory block 1065) configured to store data, program instructions for the general-purpose network operations and/or other information relating to the functionality of the techniques described herein. The program instructions may control the operation of an operating system and/or one or more applications, for example.

Because such information and program instructions may be employed to implement the systems/methods described herein, the present invention relates to machine-readable media that include program instructions, state information, etc. for performing various operations described herein.

Examples of machine-readable media include, but are not limited to, magnetic media such as hard disks, floppy disks, and magnetic tape; optical media such as CD-ROM disks; magneto-optical media; and hardware devices that are specially configured to store and perform program instructions, such as read-only memory devices (ROM) and random access memory (RAM). The invention may also be embodied in a carrier wave traveling over an appropriate medium such as airwaves, optical lines, electric lines, etc. Examples of program instructions include both machine code, such as produced by a compiler, and files containing higher-level code that may be executed by the computer using an interpreter.

Although the system shown in FIG. 11 illustrates one specific network device of the present invention, it is by no means the only network device architecture on which the present invention can be implemented. For example, an architecture having a single processor that handles communications as well as routing computations, etc. is often used. Further, other types of interfaces and media could also be used with the network device. The communication path between interfaces may be bus based (as shown in FIG. 11) or switch fabric based (such as a cross-bar).

Figure 12:
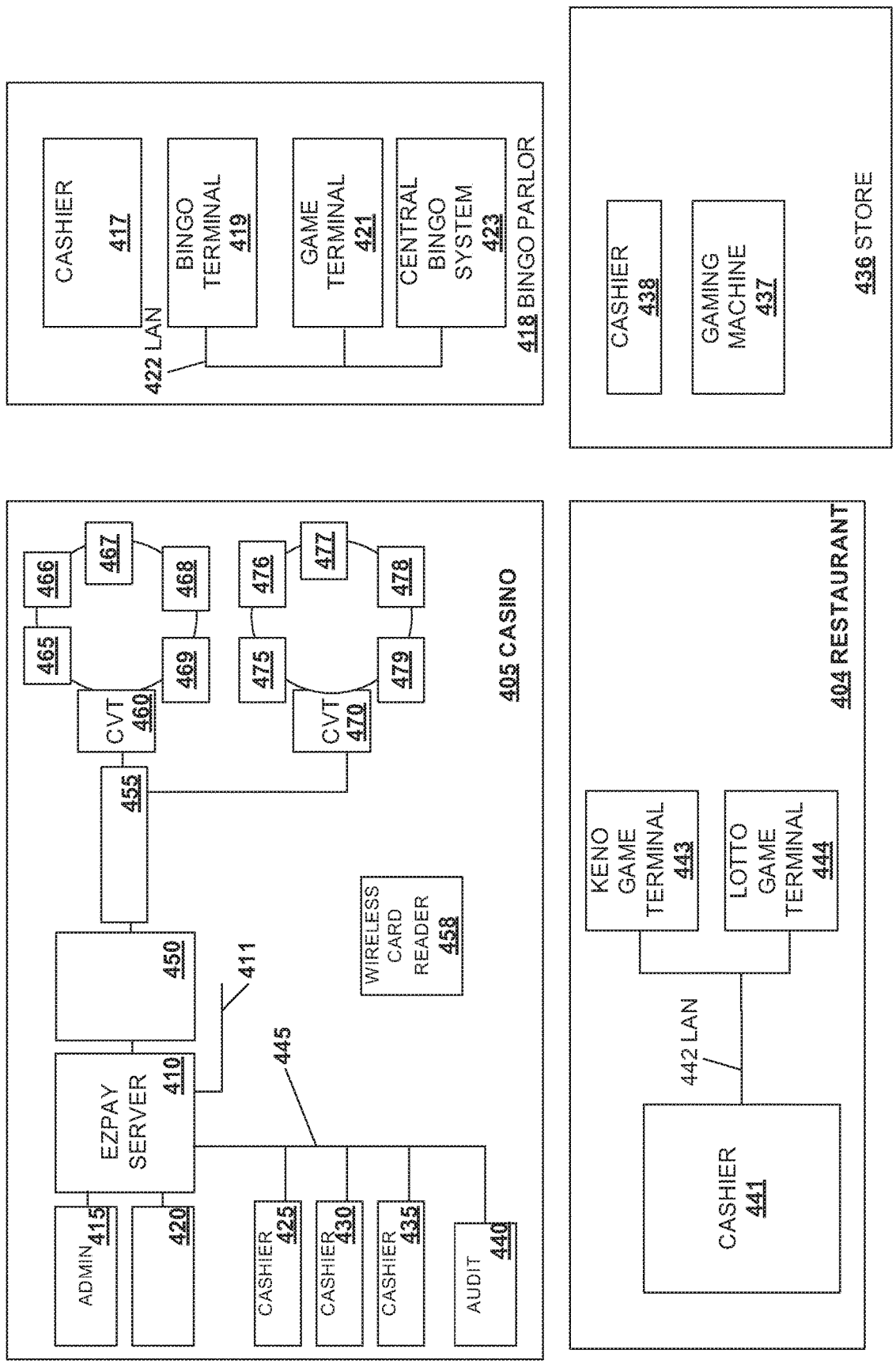
FIG. 12 illustrates gaming system including a cashless server.

FIG. 12 is a block diagram containing a plurality of gaming venues including a casino 405, a restaurant 404, a bingo parlor 418 and a store 436 where a smart card may be utilized for one embodiment of the present invention. In one embodiment, the smart card may be used with a cashless system such as an EZ Pay™ ticket voucher system. A cashless system is the hardware components and software components needed to generate and validate cashless instruments. In FIG. 11, one embodiment of the components of a cashless system that may be used with a smart card is shown within the casino 405. Further details are described with respect to U.S. Pat. No. 6,852,031, by Rowe, and titled, EZ Pay™ smart card and ticket system, which is incorporated herein by reference in its entirety and for all purposes. In this patent, examples of applications that may be incorporated as applets into a patron card as described herein are also discussed.

Components of a cashless system may include 1) data acquisition hardware, 2) data storage hardware, 3) cashless instrument generation and validation hardware (e.g. printers, card readers, ticket acceptors, validation terminals, etc.), 3) auditing software, 4) cashless instrument validation software and 5) database software. Many types of cashless systems are possible and are not limited to the components listed above or embodiments such as the EZ Pay™ ticket voucher system. Typically, a cashless system is installed at each property utilizing cashless instruments. To allow multi-site validations of cashless instruments, the cashless systems at each property may be linked to a cashless instrument transaction clearinghouse.

Returning to FIG. 12, a first group of gaming machines, 465, 466, 467, 468, and 469 is shown connected to a first clerk validation terminal (CVT) 460 and a second group of gaming machines, 475, 476, 477, 478 and 479 is shown connected to a second CVT 470. All of the gaming machines print ticket vouchers which may be exchanged for cash or accepted as credit of indicia in other gaming machine located within the property 405. In this example, the ticket voucher serves as a cashless instrument. In addition, the gaming machines may contain smart card readers for reading voucher information stored on smart cards. As described above, vouchers stored on the smart card may be used for game play on the gaming machines.

The CVTs, 460 and 470, store cashless instrument transaction information corresponding to the outstanding cashless instrument, including ticket vouchers, smart cards and debit cards, that are waiting for redemption. In addition, cashless instrument transaction information may be stored in a cashless server including the EZ pay server 410. The cashless instrument transaction information may be used when the vouchers are validated and cashed out or redeemed in some manner. The CVTs 460 and 470 may store the information for the ticket vouchers printed by the gaming machines connected to the CVT. In addition, the CVTs 460 and 470 may store the information for vouchers stored on a smart card that were generated on each gaming machine. For example, CVT 460 stores voucher information for vouchers issued by gaming machines 465, 466, 467, 468, and 469. In addition, the CVTs may store security information, as described above for the smart cards. The security information may be used to validate a digital signature generated by the smart card or to cancel a card.

In this embodiment, when a player wishes to cash out a voucher, the player may redeem vouchers issued from a particular gaming machine at the CVT associated with the gaming machine or any other CVT which is part of the cashless system associated with the CVT. For example, since CVT 460 and CVT 470 are connected as part of a single cashless system to the EZ pay server 410, a player may redeem vouchers or utilize vouchers at the gaming machines, the CVT's (460 or 470), the cashiers (425, 430, 435, and 440) or the wireless cashiers 458. The CVTs, cashiers, wireless cashiers and gaming machines may be referred to as "cashless validation sites."

To cash out a voucher stored on a smart card, the smart card is inserted into a smart card reader at the cashless validation site and the authenticity of the smart card is determined. For an authenticated smart card storing one or more vouchers, one of the vouchers is validated by comparing information obtained from the voucher with information stored within the CVT. After a ticket voucher has been cashed out, the CVT marks the voucher paid in a database to prevent a voucher with similar information from being cashed multiple times.

In this embodiment using the EZ pay system, multiple groups of gaming machines connected to CVTs are connected together in a cross validation network 445. The cross validation network is typically comprised of one or more concentrators 455 which accepts inputs from two or more CVTs and enables communications to and from the two or more CVTs using one communication line. The concentrator is connected to a front end controller 450 which may poll the CVTs for voucher information. The front end controller is connected to an EZ Pay™ server 410 which may provide a variety of information services for the cashless system including accounting 420, administration 415, as well as smart card security.

A single hardware and software platform allowing cashless instruments to be utilized at all of the cashless validation sites (e.g. cashier stations, gaming machines, wireless cashiers and CVTs) within a single property or across multiple properties may be referred to as a "cashless server". In this embodiment, the EZ pay server 410 may function as the cashless server. Usually, the cashless server is a communication nexus in the cross validation network. For instance, the EZ pay server 410 is connected to the cashiers, wireless devices, CVTs and the gaming machines via the CVTs. Since the EZ pay server 410 is connected to all of the devices utilizing smart cards, it may be used to implement smart card security features such as clearing the use of a smart card after it has entered a fail-safe mode as previously described or canceling a smart card.

The cross validation network allows vouchers issued by any gaming machine connected to the cross validation to be accepted by other gaming machines in the cross validation network 445. Additionally, the cross validation network allows a cashier at a cashier station 425, 430, and 435 to validate any voucher generated from a gaming machine within the cross validation network 445. To cash out a voucher, a player may present a smart card storing one or more vouchers at one of the cashier stations 425, 430, and 435 or to a game service representative carrying a wireless gaming device for validating ticket vouchers. A more complete discussion of the details of the wireless gaming device 458, including hardware and utilization, are described in copending U.S. patent application Ser. No. 09/544,844 entitled a WIRELESS GAME ENVIRONMENT filed Apr. 7, 2000 by Rowe, now U.S. Pat. No. 6,682,421, which is incorporated herein by reference in its entirety and for all purposes. Information obtained from the voucher may be used to validate the voucher by comparing information on the ticket with information stored on one of the CVTs connected to the cross validation network or with information stored in the EZ pay server 410.

As vouchers stored on smart cards are validated, this information may be sent to audit services computer 440 providing audit services, the accounting computer 420 providing accounting services or the administration computer 415 providing administration services. In another embodiment, all of these services may be provided by the cashless server including the EZ pay server 410. Examples of auditing services, which may be provided by cashless system software residing on the auditing computer 440 include 1) session reconciliation reports, 2) soft count reports, 3) soft count verification reports, 4) soft count exception reports, 5) machine voucher status reports and 5) security access report. Examples of accounting services, which may be provided by cashless system software residing on the accounting computer 420 include 1) voucher issuance reports, 2) voucher liability reports, expired voucher reports, 3) expired voucher paid reports and 4) voucher redemption reports. Examples of administration services, which may be provided by cashless system software residing on the administration computer 415 include 1) manual voucher receipt, 2) manual voucher report, 3) voucher validation report, 4) interim validation report, 5) validation window closer report, 6) voided voucher receipt and 7) voided voucher report.

A smart card used at the casino 405 may also be used at other venues. For instance, after storing one or more cashless vouchers on a smart card, a player may take the smart card to the bingo parlor 418. At the bingo parlor 418, a player may utilize the smart card at the bingo terminal 419 and game terminal 421 which may be connected to a LAN 422 to a central gaming system 423. At the cashier 417, electronic bingo cards may be downloaded to the smart card from the central electronic bingo system 423 and issued to the player. The player then may insert the smart card into the stationary player such as the bingo terminal 419, handheld player, or other applicable game play devices and may load the bingo cards from the smart card for use in a bingo game. As the bingo games are played, the smart card is updated and the player may receive player points for game play or cash/vouchers for game wins. Player tracking information and voucher information may be stored on the smart card and communicated back to the central bingo system 423. The player can reload the smart card with additional bingo cards as needed. In addition, when the player does not already have a smart card, the player may sign up for a smart card where the bingo cards are purchased (e.g. cashier 417).

Using the smart card, a player may also have one or more bingo progressive jackpots being played for which are tracked and managed on the smart card. This would allow a player to build the value of their own bingo progressive, which they are playing to win based upon bingo game play. As bingo game play continues, the value of the bingo progressive prize they are playing for increases. When a specific trigger occurs, such as a certain bingo card combination, the bingo progressive prize may be won and credited to the player account.

In the bingo parlor 418, a player may play other games besides bingo at the game terminal 421. For instance, a customer may wish to purchase a predefined set of electronic pull-tabs. In an electronic pull-tab, a player may reveal covered symbols in columns and rows displayed in the pull-tab game. The symbols that are revealed allow the player to determine whether an award was obtained. The pull-tabs may be purchased at the cashier 417 and may be placed on the smart card to be played in one of the electronic player devices which allows the user to play the pull-tab game such as the game terminal 421. All player points associated with the pull-tab purchases and the results of the pull-tab game play may be collected and stored on the smart card. All pull-tab wins may also be stored on the smart card and may be redeemable at a redemption center. The pull-tab game play and bingo game play using the smart card is not limited to the bingo parlor and may be extended to other venues such casinos, stores and restaurants. In addition, other electronic games, as approved by a given gaming jurisdiction may be used with the smart card.

After playing at the casino 405 and the bingo parlor 418, a player may enter the restaurant 404 and play a keno game or a lotto game. The player may purchase keno game plays and lotto game plays from a cashier terminal 441 connected to the keno game terminal 443 and lotto game terminal 444 by a LAN 442. The keno game plays and lotto game plays may be downloaded to the player's smart card. At the keno game terminal 443 and at the lotto game terminals 444 located at a table where the player may be eating, the player may use their smart card at the terminals to play the lotto games and keno games stored on the card. Within a keno or lotto environment a certain set of numbers are drawn with the player attempting to match those numbers, the smart card may contain sets of lucky numbers and associated game types the player wishes to use each time the player plays. In this manner, the player need only establish the set of numbers one time. Further, as described above, the smart card may execute applications allowing the player to store cash vouchers awarded from keno game play or lotto game play and accumulate loyalty points on the smart card from keno game play and lotto game play.

After using the smart card at the casino 405, the bingo parlor 418, the restaurant 404, the play may go to the store with their smart card. At the store 436, the player may purchase gift items at the cashier 438 and engage in game play at the gaming machine 437. Using the smart card, the player may accumulate loyalty points based on their purchases and game play. In addition, the player may use vouchers stored on the smart card for game play or purchases. In another example, the player may win a progressive jackpot on the gaming machine 437 based upon progressive game information stored on the smart card from game play at one or more venues.

Although the foregoing invention has been described in detail by way of illustration and example for purposes of clarity and understanding, it will be recognized that the above described invention may be embodied in numerous other specific variations and embodiments without departing from the spirit or essential characteristics of the invention. Certain changes and modifications may be practiced, and it is understood that the invention is not to be limited by the foregoing details, but rather is to be defined by the scope of the appended claims.

The invention is claimed as follows:

1. A gaming system comprising:
a display device;
a processor; and
a memory device storing a plurality of instructions, that when executed by the processor, cause the processor to:
responsive to determining a first authentication of a wireless mobile device by a logic device, enable up to a first amount of cash value to be transferred from an account associated with the wireless mobile device to the gaming system,
responsive to determining a second authentication of the wireless mobile device by a remote host, enable more than the first amount of cash value to be transferred from the account associated with the wireless mobile device to the gaming system, and
responsive to receiving a request to wager a portion of the cash value transferred from the account on a play of a wagering game, cause the display device to display the play of the wagering game.

2. The gaming system of claim 1, wherein the logic device is operatively connected to the processor.

3. The gaming system of claim 2, wherein the first authentication is by the logic device and not by the remote host.

4. The gaming system of claim 3, wherein the second authentication is partially by the logic device and partially by the remote host, wherein the remote host is separate from the wireless mobile device and separate from the gaming system.

5. The gaming system of claim 4, which comprises a communication interface configured to communicate with the remote host.

6. The gaming system of claim 1, wherein the second authentication is also partially by the logic device.

7. The gaming system of claim 1, wherein the second authentication is partially by the remote host and the remote host is separate from the wireless mobile device and separate from the gaming system.

8. The gaming system of claim 7, which comprises a communication interface configured to communicate with the remote host.

9. The gaming system of claim 7, wherein the plurality of instructions, when executed by the processor, cause the processor to determine the second authentication when the wireless mobile device is in an online state.

10. The gaming system of claim 1, which comprises a housing, and a plurality of input devices supported by the housing, the plurality of input devices comprising an acceptor and a cashout device, wherein the plurality of instructions, when executed by the processor, cause the processor to operate with the plurality of input devices to: if a physical item is received via the acceptor, establish a credit balance based on a monetary value associated with the received physical item, and if a cashout input is received via the cashout device, cause an initiation of any payout associated with the credit balance.

11. A gaming system comprising:
a logic device;
a display device;
a processor; and
a memory device storing a plurality of instructions, that when executed by the processor, cause the processor to:
responsive to determining, via the logic device, a first authentication of a wireless mobile device in an offline state, enable a cashless transaction up to a first value from an account associated with the wireless mobile device to the gaming system,
responsive to determining, via a remote host different than and separate from the logic device, a second authentication of the wireless mobile device in an online state, enable a cashless transaction up to a second greater value from the account associated with the wireless mobile device to the gaming system, and
responsive to receiving a request to wager a portion of the value transferred from the account on a play of a wagering game, cause the display device to display the play of the wagering game.

12. A method of operating a gaming system, said method comprising:
responsive to determining, via a processor, a first authentication of a wireless mobile device from a logic device that is part of the gaming system, enabling up to a first amount of cash value to be transferred from an account associated with the wireless mobile device to the gaming system;
responsive to determining, via the processor, a second authentication of the wireless mobile device from a remote host that is separate from the gaming system, enabling more than the first amount of cash value to be transferred from the account associated with the wireless mobile device to the gaming system; and
responsive to receiving a request to wager a portion of the cash value transferred from the account on a play of a wagering game, causing, via a display device, to display the play of the wagering game.

13. The method of claim 12, wherein the logic device is operably connected to the processor.

14. The method of claim 13, wherein determining the second authentication is partially by data received from the remote host that is separate from the wireless mobile device and separate from the gaming system.

15. The method of claim 14, which comprises communicating, via a communication interface of the gaming system, with the remote host.

16. The method of claim 14, wherein determining the second authentication is also partially via the logic device.

17. The method of claim 12, wherein determining the second authentication is partially by the remote host that is separate from the wireless mobile device.

18. The method of claim 17, which comprises communicating, via a communication interface of the gaming system, with the remote host.

19. The method of claim 12, wherein determining the second authentication is partially by the logic device of the gaming system and partially by the remote host.

20. The method of claim 12, which comprises determining the second authentication when the wireless mobile device is in an online state.

* * * * *